United States Patent
Wittberg et al.

(10) Patent No.: US 12,363,591 B2
(45) Date of Patent: Jul. 15, 2025

(54) METHOD AND ARRANGEMENT FOR FLOW CONTROL IN A SPLIT PATH COMMUNICATION SYSTEM

(71) Applicant: Telefonaktiebolaget LM Ericsson (publ), Stockholm (SE)

(72) Inventors: Mikael Wittberg, Uppsala (SE); Torbjörn Wigren, Uppsala (SE); Martin Skarve, Enebyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/286,906

(22) PCT Filed: Oct. 23, 2018

(86) PCT No.: PCT/SE2018/051079
§ 371 (c)(1),
(2) Date: Apr. 20, 2021

(87) PCT Pub. No.: WO2020/085960
PCT Pub. Date: Apr. 30, 2020

(65) Prior Publication Data
US 2021/0360475 A1 Nov. 18, 2021

(51) Int. Cl.
*H04W 36/00* (2009.01)
*H04L 47/283* (2022.01)
(Continued)

(52) U.S. Cl.
CPC ........... *H04W 28/10* (2013.01); *H04L 47/283* (2013.01); *H04W 28/082* (2023.05); *H04W 36/0069* (2018.08); *H04W 36/0235* (2023.05)

(58) Field of Classification Search
CPC ........... H04W 36/0069; H04W 28/085; H04W 28/10; H04W 28/021; H04W 36/0232;
(Continued)

(56) References Cited

U.S. PATENT DOCUMENTS

| 8,107,440 B2* | 1/2012 | Nadas | H04W 28/02 370/332 |
| 8,185,117 B2* | 5/2012 | Fagridas | H04W 40/242 455/442 |

(Continued)

FOREIGN PATENT DOCUMENTS

EP  2854444 A1  4/2015

OTHER PUBLICATIONS

Broadcom Corporation, "Mobility for dual connectivity", 3GPP TSG RAN WG2 Meeting #81bis, R2-130990, Chicago, USA, Apr. 15-19, 2013, pp. 1-7.
(Continued)

*Primary Examiner* — Man U Phan
(74) *Attorney, Agent, or Firm* — Murphy, Bilak & Homiller, PLLC

(57) ABSTRACT

A method for transmission control in a multi-connectivity communication system comprises obtaining (S1) of an indication of decreased data rate through a first transmitting node of a multi-connectivity communication system. At least a subset of packets, originally scheduled for, and buffered in, the first transmitting node is rescheduled (S2) to at least one second transmitting node, different from the first transmitting node, of the multi-connectivity communication system, in response to the obtaining of the indication. A network node for transmission control is also disclosed.

10 Claims, 19 Drawing Sheets

(51) Int. Cl.
*H04W 28/082* (2023.01)
*H04W 28/10* (2009.01)
*H04W 36/02* (2009.01)

(58) Field of Classification Search
CPC .... H04W 28/08; H04L 47/283; H04L 47/122; H04L 5/0035; H04L 5/0048; H04L 5/006; H04L 5/00; H04L 12/841
USPC .................................................. 370/235, 336
See application file for complete search history.

(56) References Cited

U.S. PATENT DOCUMENTS

| | | | | |
|---|---|---|---|---|
| 8,311,542 B2* | 11/2012 | Persson | ................. | H04W 28/22 455/452.2 |
| 8,416,690 B2* | 4/2013 | Zhao | ................. | H04W 8/04 370/328 |
| 8,451,795 B2* | 5/2013 | Ho | ................. | H04L 1/1896 455/436 |
| 8,705,511 B2* | 4/2014 | Kim | ................. | H04N 21/43072 370/350 |
| 8,774,847 B2* | 7/2014 | Virta | ................. | H04B 17/309 455/226.1 |
| 8,995,278 B1* | 3/2015 | Vivanco | ................. | H04W 36/26 370/237 |
| 9,007,914 B2* | 4/2015 | Leung | ................. | H04W 28/0289 370/236 |
| 9,237,490 B2* | 1/2016 | Pereira | ................. | H04W 36/125 |
| 9,467,912 B2* | 10/2016 | Zhang | ................. | H04W 36/0069 |
| 9,838,938 B2* | 12/2017 | Wang | ................. | H04L 49/3072 |
| 9,848,322 B2* | 12/2017 | Zhang | ................. | H04W 72/02 |
| 9,883,419 B2* | 1/2018 | Basu Mallick | ... | H04W 28/0278 |
| 10,021,597 B2* | 7/2018 | Majmundar | ................. | H04W 28/0205 |
| 10,050,894 B2* | 8/2018 | Karaki | ................. | H04L 43/0852 |
| 10,142,799 B2* | 11/2018 | Horn | ................. | H04W 80/02 |
| 10,154,438 B2* | 12/2018 | Lee | ................. | H04W 28/085 |
| 10,206,142 B2* | 2/2019 | Majmundar | ................. | H04W 28/10 |
| 10,306,529 B2* | 5/2019 | Wang | ................. | H04W 76/11 |
| 10,368,266 B2* | 7/2019 | Basu Mallick | ................. | H04W 28/085 |
| 10,462,723 B2* | 10/2019 | Zhang | ................. | H04W 36/08 |
| 10,477,439 B2* | 11/2019 | Futaki | ................. | H04W 72/04 |
| 10,594,615 B2* | 3/2020 | Karaki | ................. | H04L 47/283 |
| 10,638,374 B2* | 4/2020 | Ye | ................. | H04W 36/023 |
| 10,674,395 B2* | 6/2020 | Mukherjee | ................. | H04L 47/11 |
| 10,681,588 B2* | 6/2020 | Majmundar | ................. | H04L 47/20 |
| 10,728,932 B2* | 7/2020 | Ohta | ................. | H04W 76/11 |
| 10,868,648 B2* | 12/2020 | Zhang | ................. | H04L 63/30 |
| 11,012,896 B2* | 5/2021 | Futaki | ................. | H04W 36/0027 |
| 11,057,814 B2* | 7/2021 | Zhang | ................. | H04W 36/0022 |
| 11,159,928 B2* | 10/2021 | Chatterjee | ................. | H04L 5/0091 |
| 11,323,851 B2* | 5/2022 | Horn | ................. | H04W 28/12 |
| 11,356,908 B2* | 6/2022 | Wu | ................. | H04W 36/08 |
| 2015/0043492 A1* | 2/2015 | Baek | ................. | H04W 56/0005 370/329 |
| 2015/0124623 A1* | 5/2015 | Li | ................. | H04W 28/0284 370/235 |
| 2015/0365857 A1* | 12/2015 | Wei | ................. | H04W 36/0085 370/331 |
| 2017/0332422 A1 | 11/2017 | Ohta et al. | | |
| 2018/0035436 A1* | 2/2018 | Sharma | ................. | H04W 16/14 |
| 2018/0338268 A1* | 11/2018 | Lee | ................. | H04L 47/2475 |
| 2021/0076262 A1* | 3/2021 | Wigren | ................. | H04L 47/30 |
| 2022/0182883 A1* | 6/2022 | Jonsson | ................. | H04L 47/30 |
| 2022/0303839 A1* | 9/2022 | Wu | ................. | H04W 36/0058 |
| 2023/0344772 A1* | 10/2023 | Johansson | ................. | H04L 47/30 |

OTHER PUBLICATIONS

Ericsson, "Introduction of option 3—Dual Connectivity with NR in E-UTRA-RAN3 parts", 3GPP TSG-RAN WG3 Meeting #95bis, R3-17xxxx. Spokane, WA, USA, Apr. 3-7, 2017, pp. 1-46.
Huawei, et al., "DL Flow control for EN-DC", 3GPP TSG-RAN WG2 NR Adhoc#2, R2-1707416, Qingdao, China, Jun. 27-29, 2017, pp. 1-3.
Wigren, Torbjörn, et al., "Globally Stable Wireless Data Flow Control", IEEE, 2016, pp. 1-10.
Wigren, Torbjörn, et al., "Globally Stable Wireless Data Flow Control", IEEE Transactions on Control of Network Systems, vol. 5, No. 1, XP-002788511, Mar. 2018, pp. 469-478.

\* cited by examiner

Fig. 21
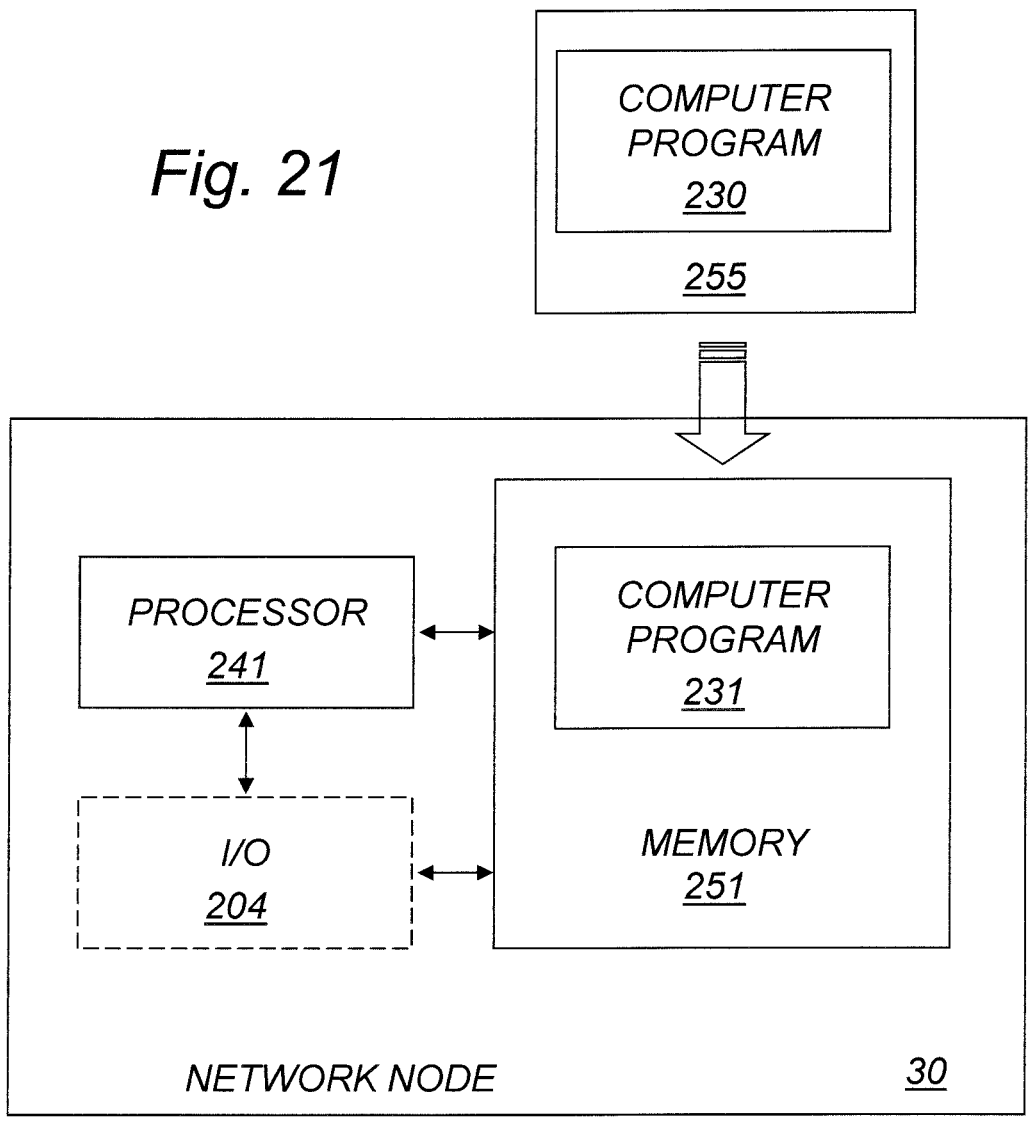
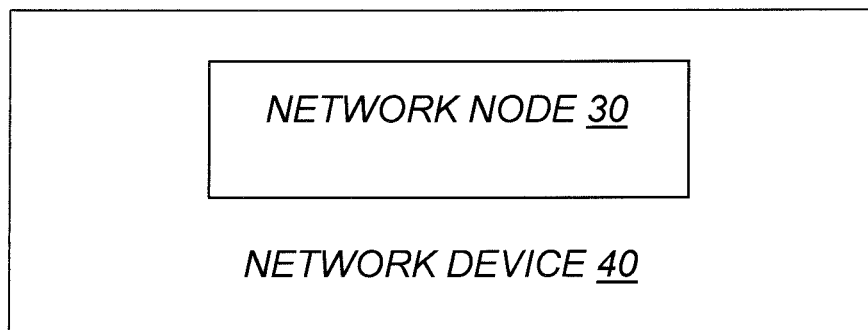
Fig. 22

METHOD AND ARRANGEMENT FOR FLOW CONTROL IN A SPLIT PATH COMMUNICATION SYSTEM

TECHNICAL FIELD

The proposed technology generally relates to methods and network nodes for transmission control in a multi-connectivity communication system.

BACKGROUND

Dual connectivity is a feature specified in later Long-Term Evolution (LTE) releases wherein the User Equipment (UE) may simultaneously receive and transmit to at least two different evolved NodeBs (eNBs). The two eNBs are denoted as (Master-) MeNB and (Secondary-) SeNB. In the split bearer architecture option of dual connectivity in the downlink, data is split on the Packet Data Convergence Protocol (PDCP) layer in the MeNB. The eNB may route PDCP Protocol Data Units (PDUs) dynamically via MeNB Radio Link Control (RLC) to the UE directly, or via a backhaul channel to the SeNB and SeNB RLC to the UE.

The data flow from MeNB to SeNB via the backhaul channel is typically controlled by a flow control algorithm, in order to balance the SeNB buffer fill state. For this purpose a flow control feedback has been defined.

Today's wireless cellular systems have been designed to handle very efficient data transfer between a single UE and a single base station, denoted eNB in 4G systems and gNB in Fifth Generation (5G) systems. These solutions are sufficient at today's carrier frequencies close to 1-2 GHz. In 5G cellular system a shift towards higher carrier frequencies is a necessity, to be able to utilize the available spectrum, thereby achieving a higher capacity overall.

A consequence of the move to higher carrier frequencies is that the radio propagation is transformed from "diffuse" scattering to beamlike propagation. This leads to sharp diffraction effects and increasingly heavy radio shadowing behind obstacles. This makes it more difficult to obtain uniform coverage from a single 5G base station. The implication is a need to transmit from multiple non-co-located transmit points, to cover a single cell. Such massive multi-point transmission is generally expected to become a cornerstone in future 5G radio access. Due to the more binary radio propagation or multi radio propagation, the importance of high performing flow control increases, to respond dynamically to very sudden changes of the radio link quality.

The Internet of Things (IoT) is expected to grow rapidly when the new 5G wireless standards are introduced. Some of the new IoT applications will require remote control over the wireless interfaces, which puts Networked Control Systems (NCS) at the focal point. Some expected applications include e.g. automotive safety, virtual reality with force feedback, and manufacturing plants with feedback controlled industrial robots. In the past, a weak point of cellular wireless systems has been their high latency, a fact that is addressed in the ongoing 5G wireless standardization. However, it is foreseen that delay tolerant networked control will remain a critical component in this equation.

One consequence of the above facts is a need for the wireless community to address the details of delay control between different transmission points. For example, in case the multi-point transmissions are not properly delay controlled, coordinated wireless transmission schemes may become less efficient. In addition, several new 5G use cases require such delay control, among these ultra-reliable multi-point transmission for machine type communication where diversity gains are to be obtained by simultaneous transmission of the same data from multiple transmission nodes. Put otherwise, unless the data transmission is efficient end-to-end, parts of the advantages with the new 5G wireless interfaces may be lost in other parts of the signal chain.

Clearly then, in a massive multi-point transmission system, where data is arriving from uplink nodes, each involved transmit point needs to be given access to (portions of) this data, for transmission over the wireless interface.

Further, in many applications the data is closely related to data simultaneously being transmitted from other transmit points. This is e.g. the case for streaming video, in which case the data for a specific part of the video are needed at the same time (to within a certain pre-determined margin) in the receiving UE.

A consequence of multi-point transmission is that incoming data streams will be split over different paths to the receiving end users. As stated above, new data flow control algorithms are then needed to ensure that the delay differences between different paths are kept within acceptable limits. The requirements on such a data flow controller include that the down link delay differences from the controller to the wireless interfaces should be controlled to remain within a specified interval of time. This requirement is needed to be consistent with the re-ordering capability set up in the mobile. It is also required that the transmit data queue dwell times of the base stations should be controlled so that the risk for wireless data starvation is low enough, whilst maintaining low dwell times. This ensures that wireless capacity is not wasted. The stability requirement is needed to guarantee the performance of the flow controller at all times, a fact that cannot be compromised in commercial deployments. Also, the control algorithm should be globally stable, at least for all loop delays up to a maximum loop delay. Finally, the computational complexity should be minimized. Since the number of controller instances may reach hundreds of thousands in a single controlling node, low computational complexity is another pre-requisite.

The current solutions for how flow control distributes the PDCP PDUs in a split Data Radio Bearer (DRB) to the different DUs works very well when the available data over the radio is varying normally according to changes in the radio environment. However, in a radio network there is always the risk that some unexpected condition occurs which leads to a dramatic decrease of the current data rate. This decrease of the data rate can for instance happen in one or in a combination of different cases. For example, if the UE enters an area where there is a shadow fading and the shadow fading may last for several seconds. Shadow fading can happen for all frequencies but is more common with higher frequencies. Alternatively or in combination, if one or more other UEs are entering the same cell as the current UE, the current rate may decrease down to a fraction of the current rate. If for instance the current UE is alone in the cell and two more UEs are entering the cell within a short time period, then the available rate for the original UE is decreased down to 33% of the original rate.

Given these unexpected and sudden events causing decreased data rate, there is a risk that the data which has already been sent to one of the Distributed Units (DUs) for transmission over the air interface, will take a much longer time to transmit. For instance, if the expected time to empty the data buffer is 50 ms, but the data rate decreases to 10% of the original rate, it will take 500 ms to empty this data buffer. Due to the requirement of in-order delivery this may cause an interruption of the data traffic of about 500 ms, and in worse case it may also cause dropped packets due to the expiration of the t-Reordering PDCP timer.

Even a perfect flow control algorithm will not be able to solve this problem because any flow control algorithm needs to ensure that there is sufficient amount of data in the RLC buffers that can always be scheduled, and hence a certain minimum buffer of data must be stored at the RLC level.

SUMMARY

It is an object to provide flow control methods and devices that are capable of sustaining sudden events causing the decreased data rate.

This and other objects are met by embodiments of the proposed technology.

According to a first aspect, there is provided a method for transmission control in a multi-connectivity communication system. The method comprises obtaining of an indication of decreased data rate through a first transmitting node of a multi-connectivity communication system. At least a subset of packets, originally scheduled for, and buffered in, the first transmitting node is rescheduled to at least one second transmitting node, different from the first transmitting node, of the multi-connectivity communication system, in response to the obtaining of the indication.

According to a second aspect, there is provided a network node configured to control transmission in a multi-connectivity communication system. The network node is configured to obtain an indication of decreased data rate through a first transmitting node of a multi-connectivity communication system. The network node is further configured to reschedule at least a subset of packets, originally scheduled for, and buffered in, the first transmitting node, to at least one second transmitting node, different from the first transmitting node, of the multi-connectivity communication system, in response to the obtaining of the indication.

According to a third aspect, there is provided a computer program comprising instructions, which when executed by at least one processor, cause the processor(s) to obtain an indication of decreased data rate through a first transmitting node of a multi-connectivity communication system. The computer program further comprises instructions, which when executed by the processor(s), cause the processor(s) to reschedule at least a subset of packets, originally scheduled for, and buffered in, the first transmitting node, to at least one second transmitting node, different from the first transmitting node, of the multi-connectivity communication system, in response to the obtaining of the indication.

According to a fourth aspect, there is provided a computer-program product comprising a computer-readable medium having stored thereon a computer program according to the third aspect.

The here presented technology provides an improved end-to-end throughput by ensuring that a sudden decrease of the data rate for one DU will reduce the performance reduction of the overall data rate to a minimum if the other DU still can provide a sufficient high data rate for the UE.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 21 is a schematic diagram illustrating an embodiment of a computer-implementation of a network node;

FIG. 22 is a schematic block diagram illustrating an embodiment of a network device;

DETAILED DESCRIPTION

Throughout the drawings, the same reference designations are used for similar or corresponding elements.

For a better understanding of the proposed technology, it may be useful to begin with a brief overview of communication systems with dual or multi connectivity options.

Figure 1:
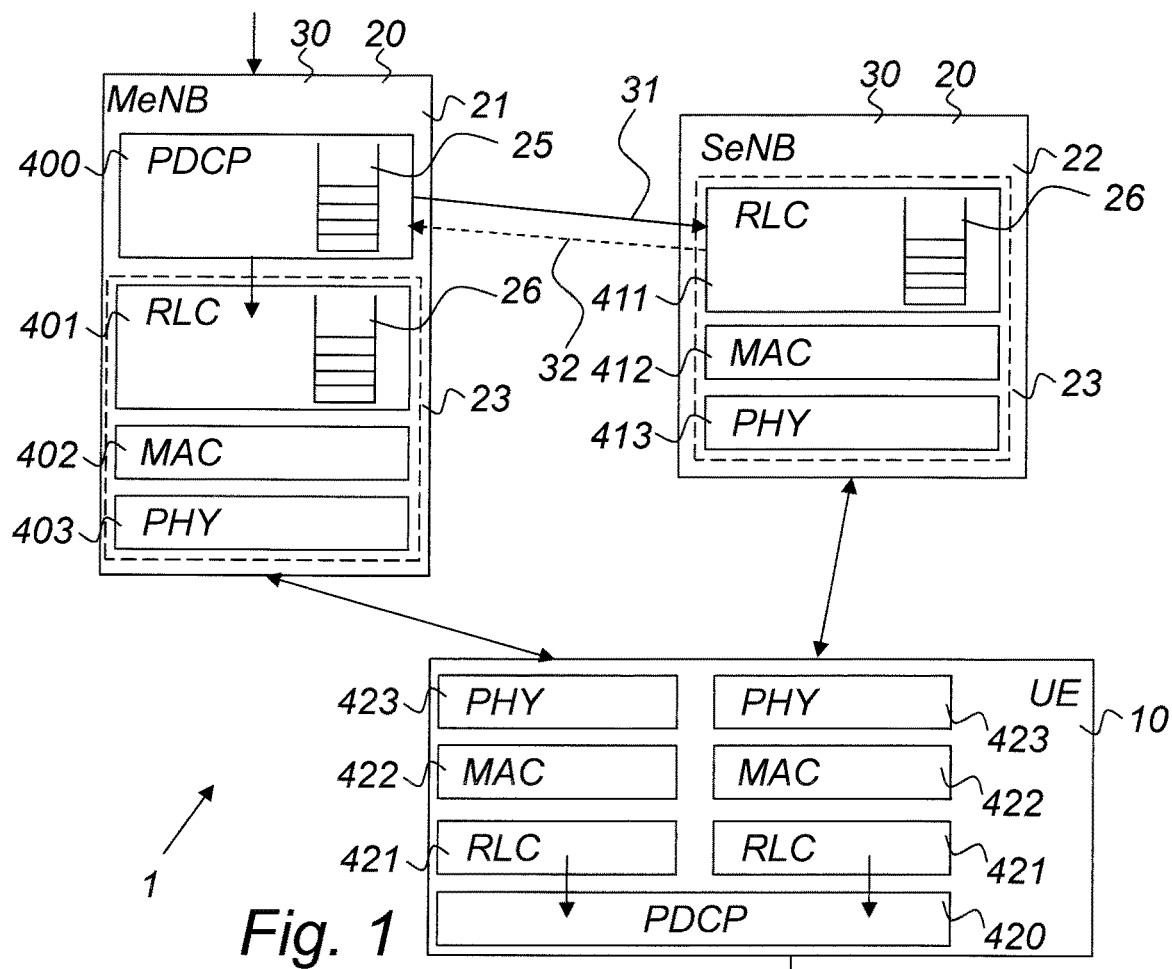
FIG. 1 is a schematic drawing illustrating LTE dual connectivity.

FIG. 1 illustrates schematically the LTE dual connectivity in a multi-connectivity communication system 1. A network node 30 comprises a NodeB 20, which in one case is a MeNB 21. Another network node 30 comprises a NodeB 20, which in this case is a SeNB 22. The relations between the MeNB 21, and the SeNB 22 are illustrated, where a downlink data transmission is depicted. A PDCP layer 400 of the MeNB 21 communicates with a RLC layer 411 of the SeNB 22 by a backhaul channel 31. Solid arrows indicate potential directions of user plane data. The dashed line 32 indicates feedback for flow control purposes between the eNBs 21, 22. Additionally data buffers 25, 26 are illustrated in MeNB 21 and SeNB 22 respectively. Note that their location in MeNB PDCP 400 and SeNB RLC 411 serves just illustrative purposes and may be implemented otherwise. Backhaul and transport are also used interchangeably. Note that there may be a transmission buffer 26 in the MeNB RLC 401 as well, e.g. in 5G and mixed radio access technology (RAT) configurations.

Both the MeNB 21 and the SeNB 22 comprises in this embodiment a respective transmitting node 23. These transmitting nodes are often also referred to as Distributed Units (DU). In this embodiment, the transmitting node 23 comprises a RLC 401, 411 with a buffer 26, a MAC layer 402, 412 and a physical layer 403, 413.

At the UE 10 side, the UE 10 comprises two sets of physical layers 423, MAC layers 422 and RLCs 421, one for each connectivity branch. In the PDCP layer 420, the received data packets are combined into a single data stream according to conventional methods.

Figure 2:
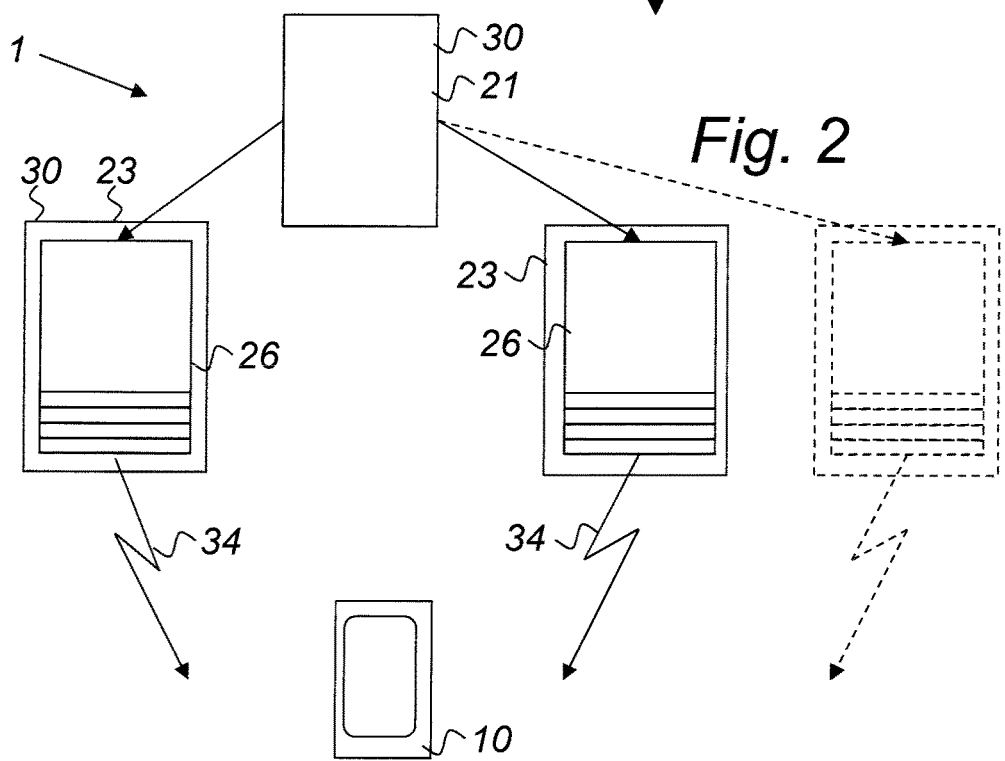
FIG. 2 is a schematic block diagram of an embodiment of packet scheduling between transmitting nodes.

FIG. 2 illustrates the handling of packets in a multi-connectivity communication system 1. A network node 30 comprising a MeNB 21 is responsible for a packet scheduling between at least two, and possibly more, transmitting nodes 23. The packet scheduling part is often referred to as a Central Unit (CU), while the transmitting nodes 23 often are referred to as DUs. The network node 30 of the MeNB 21 may also comprise one of the transmitting nodes 23, even if they are illustrated in the figure as separated network nodes. The dotted part of the figure indicates that in certain embodiments, there might be more than two transmitting nodes 23.

The packet scheduling is performed to distribute packets to the buffers 26 of the transmitting nodes 23 at a rate that ensures that the buffers 26 are not emptied and at the same time provides a transmission time to the end party which follows the delay requirements for that specific data flow, as was discussed above in the background section. In the present embodiment, a same data rate, represented by the arrow 34, for transmissions to the UE 10 from the different transmitting nodes 23 is assumed, which leads to an even distribution of packets to the two (or more) transmitting nodes. However, if the different transmitting nodes 23 have different available data rates with respect to the UE 10, the packet scheduling is adapted accordingly, scheduling less packets, or at least less data amount, to transmitting nodes having a lower data rate. The average delay time for the entire transmission from the MeNB 21 to the UE 10 is thereby kept almost the same regardless of which transmitting node 23 that is used.

Many different kinds of control mechanisms can be used for controlling the scheduling under such normal conditions. Any person skilled in the art is aware of many different approaches. One specific example of a control mechanism that can be used for controlling the scheduling under normal conditions is described in the article by T. Wigren and R. Karaki, "Globally stable wireless data flow control", IEEE Trans. Contr. Network Systems, vol. 5, no. 1, pp. 469-478 2018. DOI: 10.1109/TCNS.2016.2619906 (reference [1]). A brief summary of automatic control nomenclature is given in Appendix A together with FIG. 3 and a brief description of the globally stable single leg flow control algorithm of ref. [1] is presented in Appendix B together with FIG. 4.

In the packet scheduling between different transmitting nodes, the node comprising the packet scheduling typically stores the packets until there is a confirmation that there is no need for any retransmission. This means that a packet in a buffer of a transmitting node typically has a copy in the packet scheduling node.

As mentioned above, sudden changes of the data rate may lead to difficulties in the control mechanisms, since they are designed for slowly varying normal conditions. There are, however, approaches for handling such situations.

Figure 5:
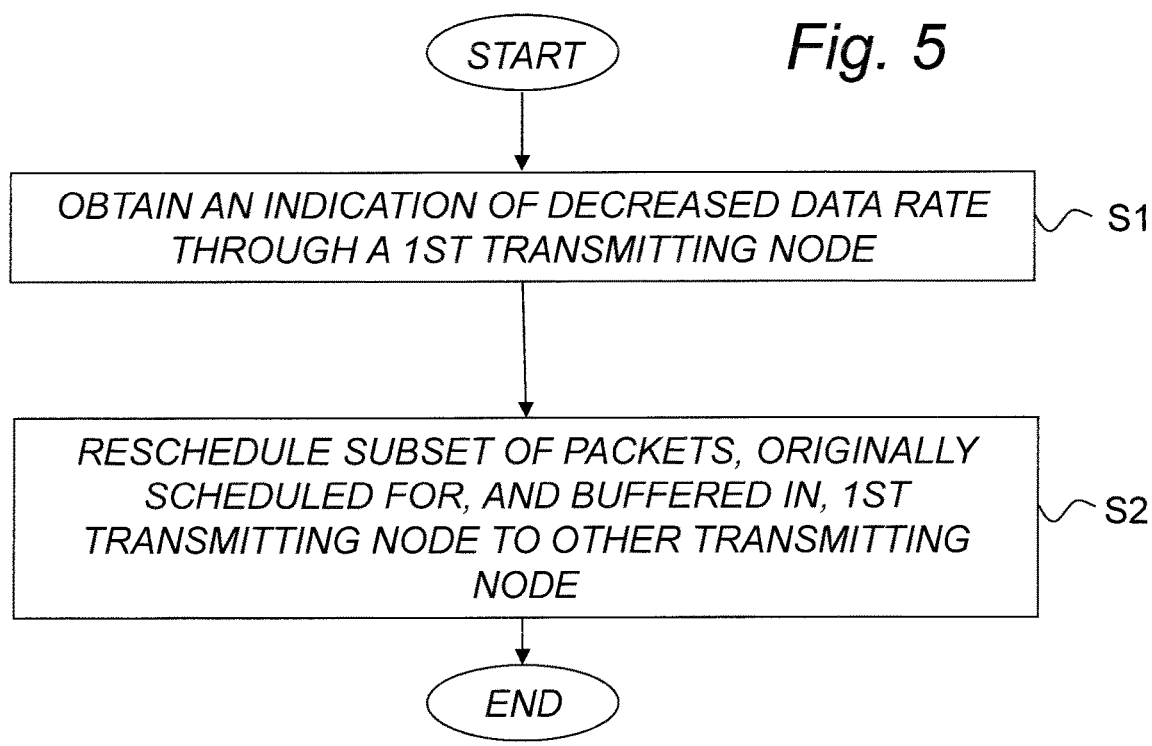
FIG. 5 is a schematic flow diagram illustrating steps of an embodiment of a method for transmission control in a multi-connectivity communication system.

FIG. 5 is a flow diagram of steps of an embodiment of a method for transmission control in a multi-connectivity communication system. In step S1, an indication of decreased data rate through a first transmitting node of a multi-connectivity communication system is obtained. As will be discussed more in detail below, the indication can be created based on received, measured or estimated information about transmission properties or the indication can be received from elsewhere, e.g. a transmitting node. Preferably, the indication of decreased data rate is based on a transmission-delay related time. The transmission-delay related time is related to transmission delay through a respective transmitting node. In step S2, at least a subset of packets, originally scheduled for, and buffered in, the first transmitting node is rescheduled, to at least one second transmitting node, different from the first transmitting node, of the multi-connectivity communication system, in response to the obtaining of the indication.

Figure 6A:
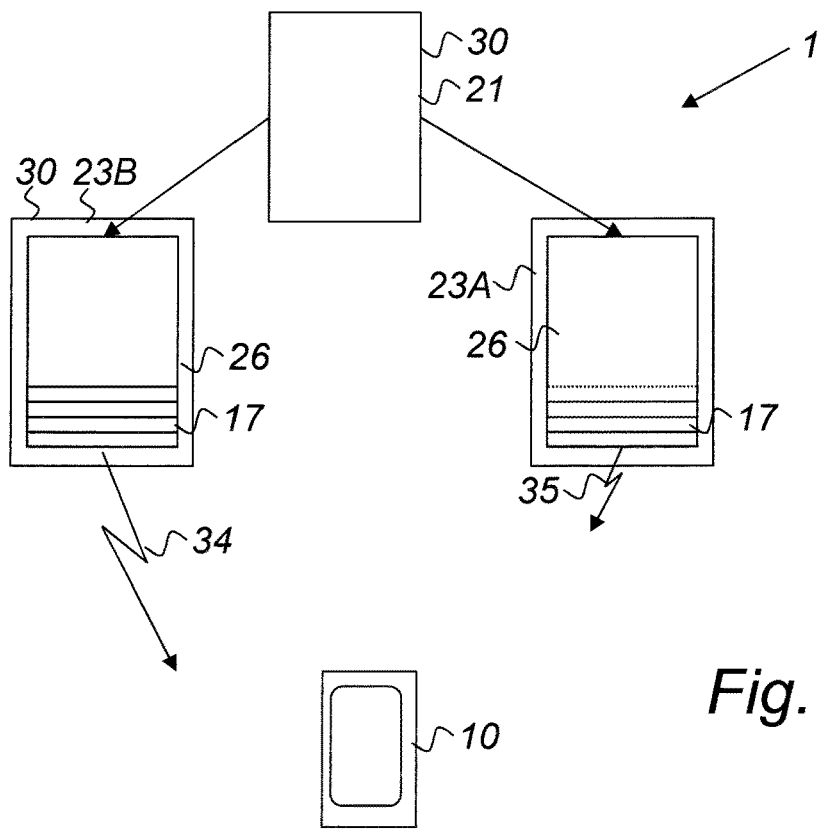
FIGS. 6A-B are schematic block diagrams of an embodiment of packet scheduling between transmitting nodes upon a change in data rate.

FIG. 6A illustrates schematically an embodiment of a multi-connectivity communication system 1, in this particular embodiment a dual-connectivity communication system. Under normal conditions, this system behaves in the same manner as the system in FIG. 2. The two transmitting nodes 23A, 23B shares the packets 17 to be sent to the UE 10 in relation to the available steady-state transmission rate and buffer them in a respective buffer 26. However, in the multi-connectivity communication system 1 of FIG. 6A, the transmission rate 35 of a first transmitting node 23A has suddenly decreased considerably. The expected time for the packets 17 in the buffer 26 of the first transmitting node 23A to reach the UE 10 has therefore suddenly increased in correspondence to the decreased transmission rate 35. There is a substantial risk that the buffered packets will reach the UE 10 too late.

Figure 6B:
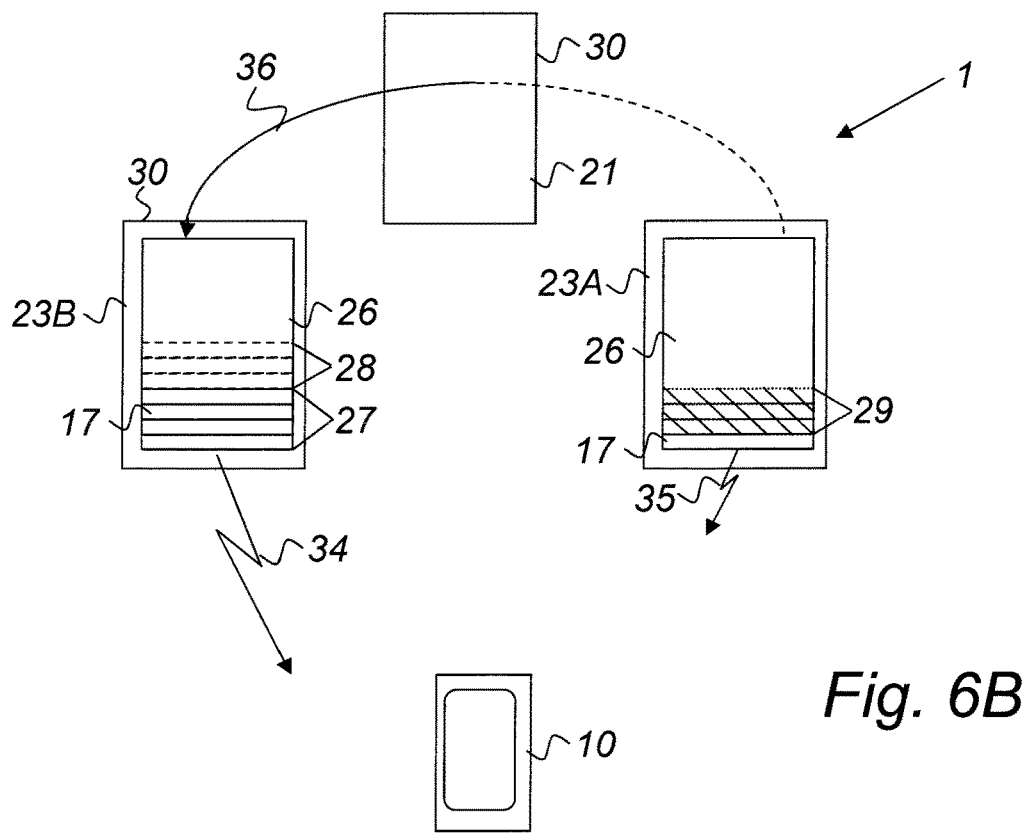

According to the here above presented ideas, the situation is rescued according to FIG. 6B. An indication of the decreased data rate through the first transmitting node 23A is obtained. As a response to this indication, a subset 29 of the packets 17 stored in the buffer 26 of the first transmitting node 23A is selected. The subset 29 of packets are rescheduled 36 to the second transmitting node 23B. If these packets are stored also in the packet scheduling node 21, the packets can be transferred immediately to the second transmitting node 23B. Otherwise, the packets have to be re-transferred from the first transmission node 23A before packet rescheduling is performed. After the packet rescheduling, the second transmission node 23B has a buffer 26 comprising the packets 27 originally scheduled to the second transmission node 23B as well as the packets 28 being rescheduled.

Figure 7:
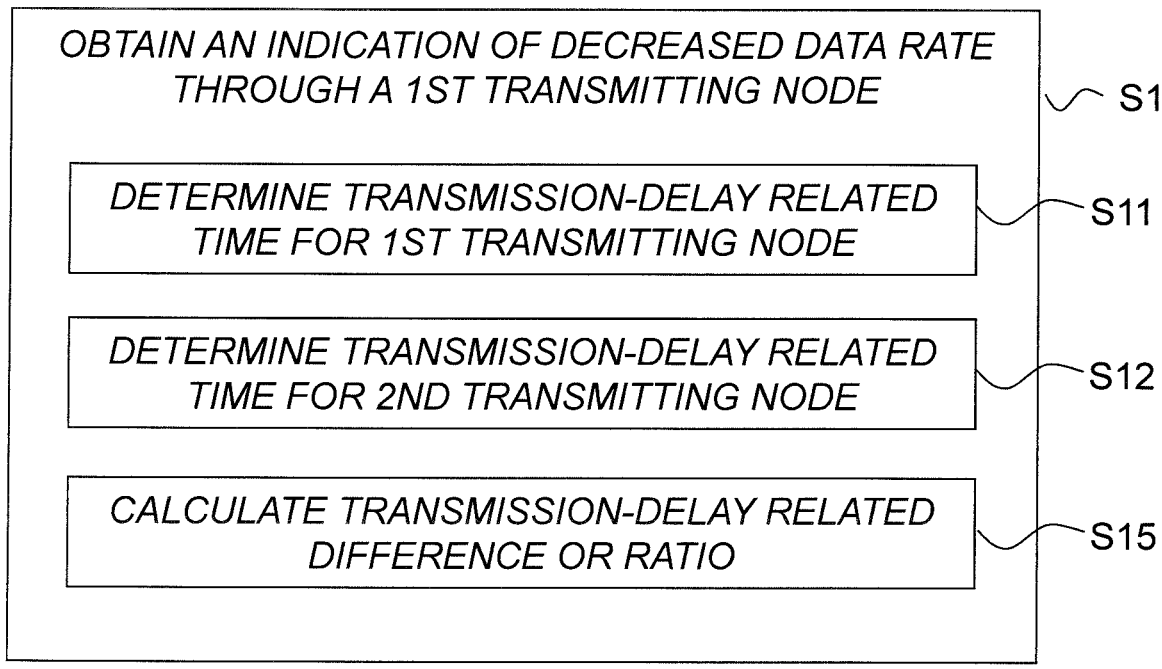
FIG. 7 is a part flow diagram of an embodiment of an indication obtaining step.

The obtaining of the indication of decreased data rate through a first transmitting node can be performed in different ways. FIG. 7 illustrates one embodiment of step S1. In this embodiment, a transmission-delay related time is determined in step S11 for a first transmitting node. The nature of, and examples of, such transmission-delay related time will be discussed further below. In step S12, a transmission-delay related time is also determined for one or more second transmitting nodes. The second transmitting node(s) is different from the first transmitting node. In step S15, a transmission-delay related difference or ratio is calculated as a difference or ratio, respectively between the determined transmission-delay related time for the first transmitting node and a quantity based on the determined transmission-delay related time for the second transmitting node(s). The indication of decreased data rate is thereby based on at least the determined transmission-delay related time for the first transmitting node. Furthermore, in the present embodiment, the indication of decreased data rate is based on at least the transmission-delay related difference.

The transmission-delay related difference or ratio can be time filtered to get a less varying value.

In one embodiment, the above mentioned problems are solved by means of the following functionality typically hosted in the Central Unit-User Plane (CU-UP). Measurements of a transmission-delay related time, e.g. a round trip time, for both legs of a dual connectivity flow control architecture are performed. It is then evaluated whether the round trip time for one transmitting node, or DU, is greater than the round trip time of the other DU with a certain ratio or with a certain specific delta time. If this is the case, a retransmission of PDCP PDUs from the DU with the long round trip time to the DU with the short round trip time is triggered. If the PDCP PDU keeps copies of the packets, the retransmission is carried out from the CU, of copies of PDCP PDUs already sent to the DU with the long round trip time, by marking all PDCP PDUs previously sent to this DU as subject for retransmission.

A least complex way to calculate a transmission-delay related difference or ratio is to use a transmission-delay related time for one of the second transmitting nodes as the quantity based on the transmission-delay related time for the at least one second transmitting node. For a dual-connectivity system, having only one second transmitting node, the transmission-delay related difference or ratio thereby becomes the difference or ratio between the first and second transmitting node, respectively.

For a multi-connectivity communication system with more than two transmitting nodes, there are several alternatives. In one embodiment, the quantity based on the transmission-delay related time for the second transmitting nodes is a minimum transmission-delay related time for all second transmitting nodes. In this embodiment, this will give the maximum difference or ratio.

In another embodiment, the quantity based on the transmission-delay related time for the second transmitting nodes is an average of transmission-delay related times for all the second transmitting nodes. In a further embodiment, the average of transmission-delay related times for all the second transmitting nodes is an average weighted with an estimated throughput of each second transmitting node. In these embodiments, the overall situation of the multi-connectivity communication system is taken into account.

Based on the transmission-delay related difference or ratio, the network node responsible for the packet scheduling, i.e. typically the CU-UP, will evaluate if there is a need to trigger retransmit, e.g. of the PDCP PDUs.

In one embodiment, if the transmission-delay related time for the first transmitting node, e.g. the round trip time, is greater than a specific factor X compared with the transmission-delay related time for the second transmitting node(s), i.e. other DUs, the CU-UP will create an indication of a decreased data rate. This will in turn trigger retransmission of PDCP PDUs from the DU with the longer round trip time to the DU with the shorter round trip time. Expressed in other words, the indication of decreased data rate is concluded if the transmission-delay related ratio exceeds a threshold.

In another embodiment, if the transmission-delay related time for the first transmitting node, e.g. the round trip time, is greater than a specific offset Y for one DU compared with the other DU, the CU-UP will create the indication. As a response on the indication, retransmission of PDCP PDUs from the DU with the longer round trip time to the DU with the shorter round trip time will be trigged. Expressed in other words, the indication of decreased data rate is concluded if the transmission-delay related difference exceeds a threshold.

In yet another embodiment, both these aspects can be combined. If the round trip time is greater than a specific factor X and also greater than a specific offset Y for one DU compared with the other DU, the CU-UP will trigger retransmit of PDCP PDUs from the DU with the longer round trip time to the DU with the shorter round trip time.

In another embodiment, the obtaining of the indication may be provided with a delay function prohibiting retransmission to occur too frequently. To this end, the indication may only be obtained if a certain time has passed since the last retransmission was performed. This ensures that retransmit of PDCP PDUs will only be triggered provided that the time since the last retransmit was performed is at least a time period Z.

If a transmission-delay related time for the transmission nodes is not possible to determine by measurements, such quantities may instead be estimated in different manners. Such estimation procedures are, as such, well known in prior art and will therefore not be further described in detail. The so achieved estimated transmission-delay related time can then be used in the same way as indicated above for measured transmission-delay related time.

Therefore, in the present disclosure, the term "determine" should be interpreted as comprising both "measuring" and "estimating" and different hybrids thereof.

In some applications, there might be difficult to obtain reliable determinations (measurements or estimations) of transmission-delay related times of other transmitting nodes than the first one. In such situations, a simpler variation of the obtaining of the indication may be used.

Figure 8:
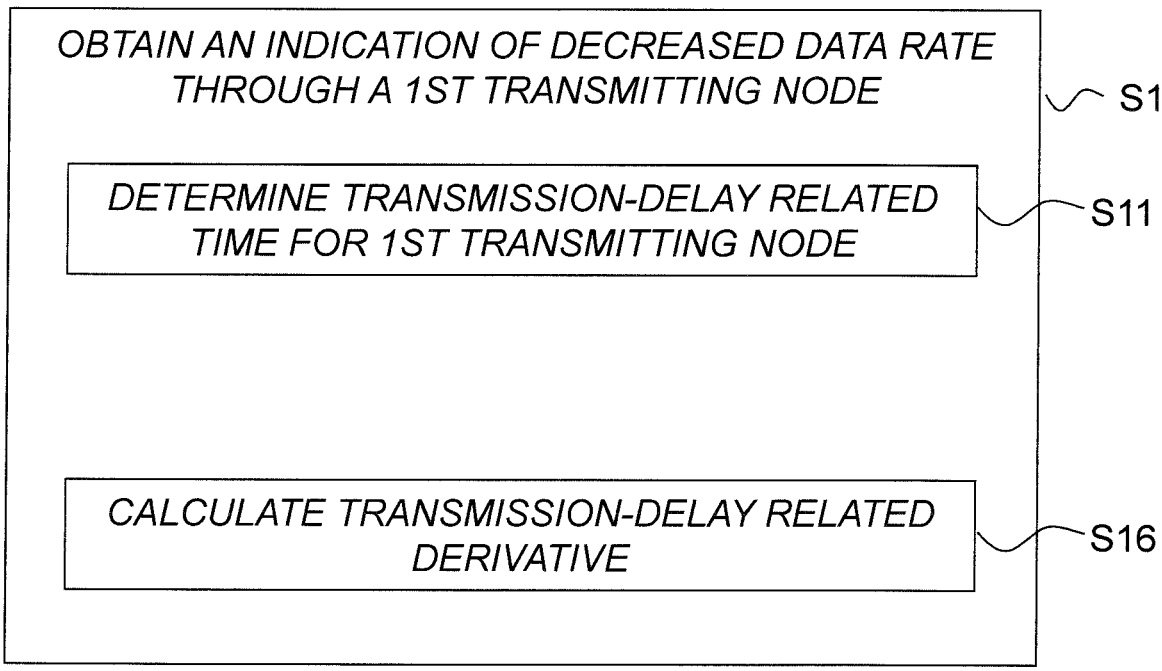
FIG. 8 is a part flow diagram of another embodiment of an indication obtaining step.

FIG. 8 illustrates a flow diagram of an embodiment of the step S1 of FIG. 5. The step S1 of obtaining the indication comprises further substeps. In step S11, as described further above, a transmission-delay related time is determined for a first transmitting node. In step S16, a transmission-delay related derivative is calculated as a time derivate of the transmission-delay related time of the first transmitting node.

In one further embodiment, the indication of decreased data rate is concluded if the transmission-delay related derivative exceeds a threshold.

In another further embodiment, the indication of decreased data rate is concluded if the transmission-delay related derivative divided by the transmission-delay related time for the first transmitting node exceeds a threshold.

The transmission-delay related time can be of slightly different kinds, but all connected to the transmission and buffering of scheduled packet.

In one embodiment, the transmission-delay related time is a round trip time for a last acknowledged packet transmitted through the respective transmitting node.

The round trip is then measured as the time, typically in the CU-UP, from packet transmission until packet acknowledgement is received. This preferably implies that the meta data for each transmitted packet includes a time stamp with transmission time and that received acknowledgements (highest transmitted PDCP sequence number or highest successfully delivered PDCP sequence number) are time stamped as well. The difference in time is the total round trip time.

Figure 9:
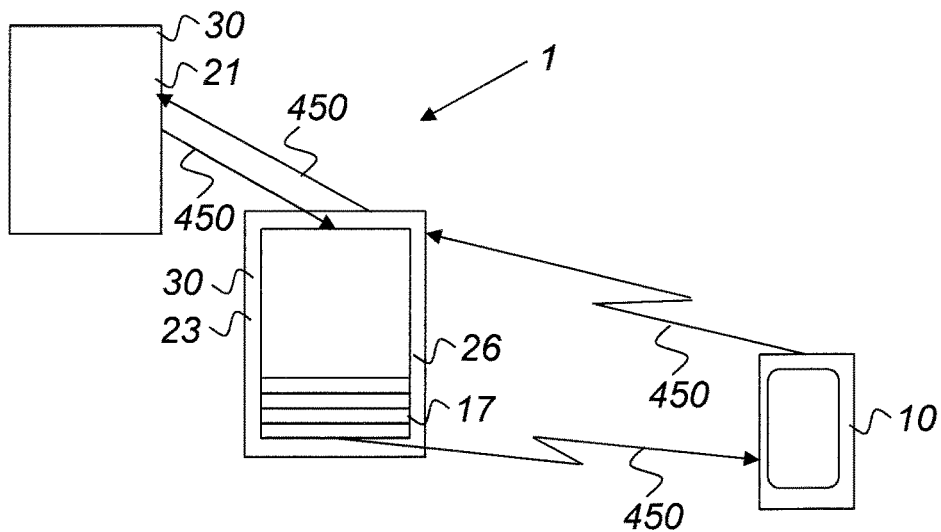
FIGS. 9-14 are schematic illustrations of embodiments of transmission-delay related times.

Such a scenario is schematically illustrated in FIG. 9. The MeNB 21 packet schedules packet to a SeNB 23. The scheduled packet runs through the buffer 26 of the SeNB 23 and is subsequently transmitted to the targeted UE 10. The UE replies with an acknowledgement message indicating which packet is concerned and the SeNB 23 forwards the acknowledgement to the MeNB 21. The transmission-delay related time is then the round trip time corresponds to all parts of the communication path 450.

In another embodiment, the transmission-delay related time is an age of an oldest non-acknowledged packet scheduled to be transmitted through the respective transmitting node. In this embodiment the round trip time is thus measured as the current age of sent packets from CU-UP from which no acknowledgement (highest transmitted PDCP sequence number or highest successfully delivered PDCP sequence number) yet has been received. The age of the oldest packet for each DU is used to identify the transmission-delay related time per DU.

Figure 10:
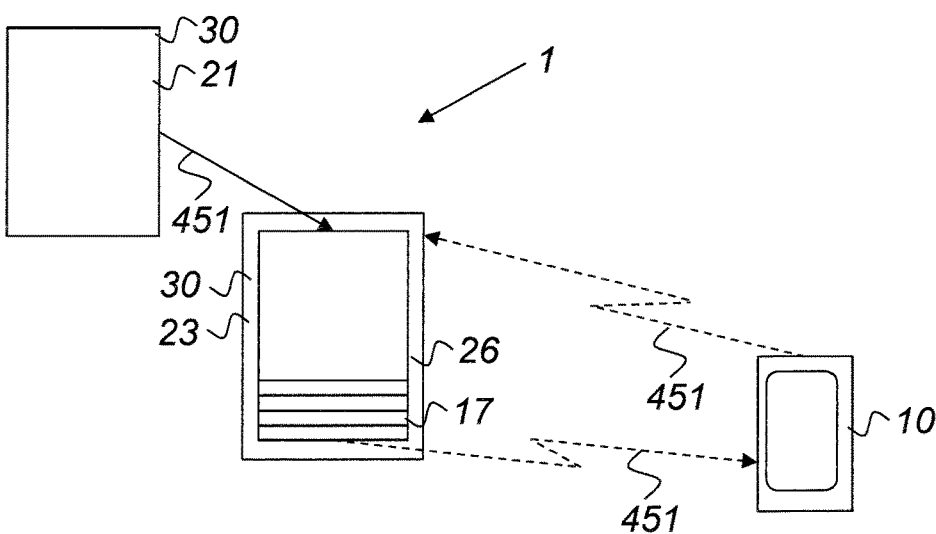

Such a scenario is schematically illustrated in FIG. 10. The MeNB 21 packet schedules packet to a SeNB 23. The scheduled packet runs through the buffer 26 of the SeNB 23. The packet may or may not have been transmitted to the targeted UE 10. The UE may also or may not have replied with an acknowledgement message indicating which packet is concerned. However, the SeNB 23 has not yet forwarded any acknowledgement to the MeNB 21. The transmission-delay related time is then the parts of a round trip time that may include the communication paths 451.

In another embodiment, the transmission-delay related time is a time between packet scheduling and receipt of a confirmation of transmission from the respective transmitting node for a last packet transmitted through the respective transmitting node.

Figure 11:
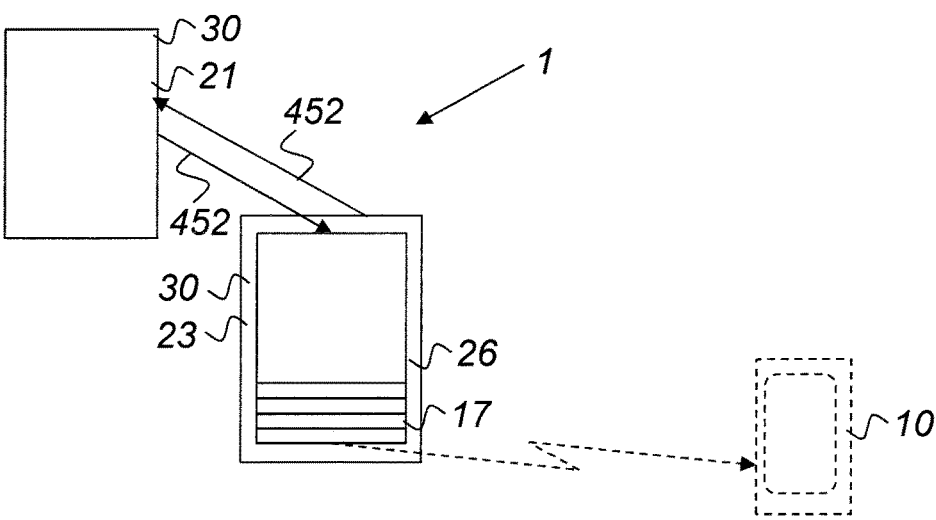

Such a scenario is schematically illustrated in FIG. 11. The MeNB 21 packet schedules packet to a SeNB 23. The scheduled packet runs through the buffer 26 of the SeNB 23 and is subsequently transmitted to the targeted UE 10. The SeNB 23 sends a confirmation of that a transmission has been performed, to the MeNB 21. The transmission-delay related time is then the time corresponding to the communication path 452. The path of the actual transmission to the UE 10 is in this embodiment not included in the transmission-delay related time.

In another embodiment, the transmission-delay related time is an age of an oldest packet scheduled to be transmitted through the respective transmitting node, for which packet no confirmation of transmission from the respective transmitting node is received.

Figure 12:
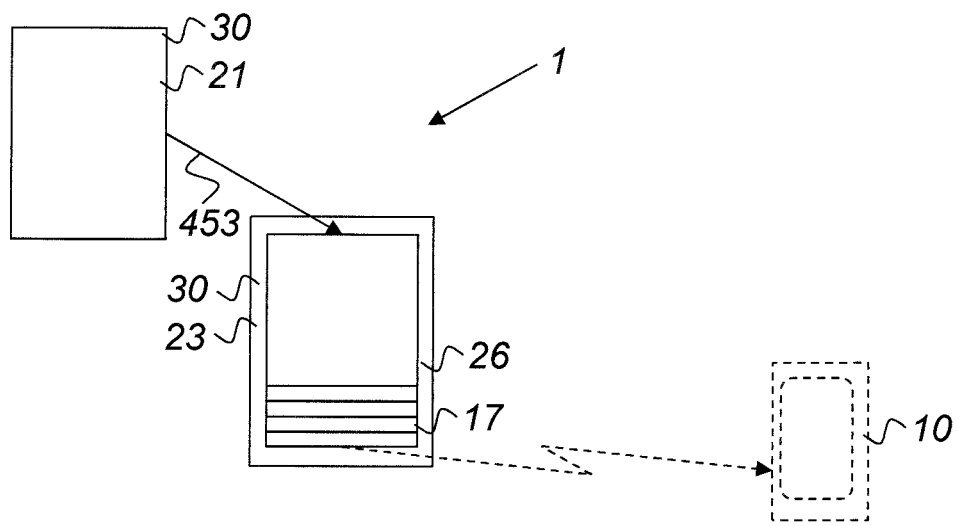

Such a scenario is schematically illustrated in FIG. 12. The MeNB 21 packet schedules packet to a SeNB 23. The scheduled packet runs through the buffer 26 of the SeNB 23. The packet may or may not have been transmitted to the targeted UE 10. However, the SeNB 23 has not yet sent any confirmation of transmission to the MeNB 21. The transmission-delay related time is then the longest trip time that includes the communication path 453 and the time in the buffer 26 but for which no confirmation is received.

In another embodiment, the transmission-delay related time is based on a received quantity representing a present buffer length in the respective transmitting node. The transmission-delay related time is then determined as the present buffer length divided by an estimated transmission rate from the transmitting node.

The transmission-delay related time may also basically be measured in the DU. The measurement can be performed as noting the actual time from the packet is received in DU until transmission to lower layers is performed or until the packet acknowledgement is received. Alternatively, the transmission-delay related time can be determined as a packet age since the oldest packet was received in the DU.

Above measurements may additionally include Transport Network (TN) delay measurements. The DU performed measurements may be transmitted to the CU-UP over an F1-U 38.425 interface to enable triggering. This would in such a case require an update of the standard. The most appropriate update would be to include a new Information Element in the Assistance Information PDU (type 2). The reporting could be initiated by CU polling or event configured reporting in the DU.

Figure 13:
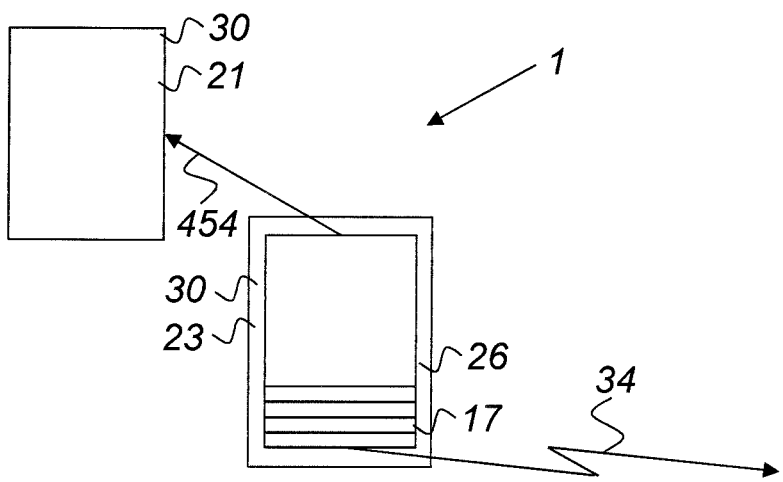

Such a scenario is schematically illustrated in FIG. 13. The SeNB 23 notes the time of the incoming scheduled packet. The scheduled packet then runs through the buffer 26 of the SeNB 23. Upon leaving the buffer 26, a time of the packet within the SeNB 23 can be determined. Alternatively, the length of the buffer 26 may be divided by the estimated transmission rate. The SeNB 23 sends information 454 to the MeNB 21.

In another embodiment, the transmission-delay related time is based on a received buffer-time difference of a last transmitted packet from the respective transmitting node. The buffer-time difference is calculated as a difference between a transmission time from the respective transmitting node and a time stamp of the transmitted packet. The time stamp is provided by a node time synchronized with the respective transmitting node.

Figure 14:
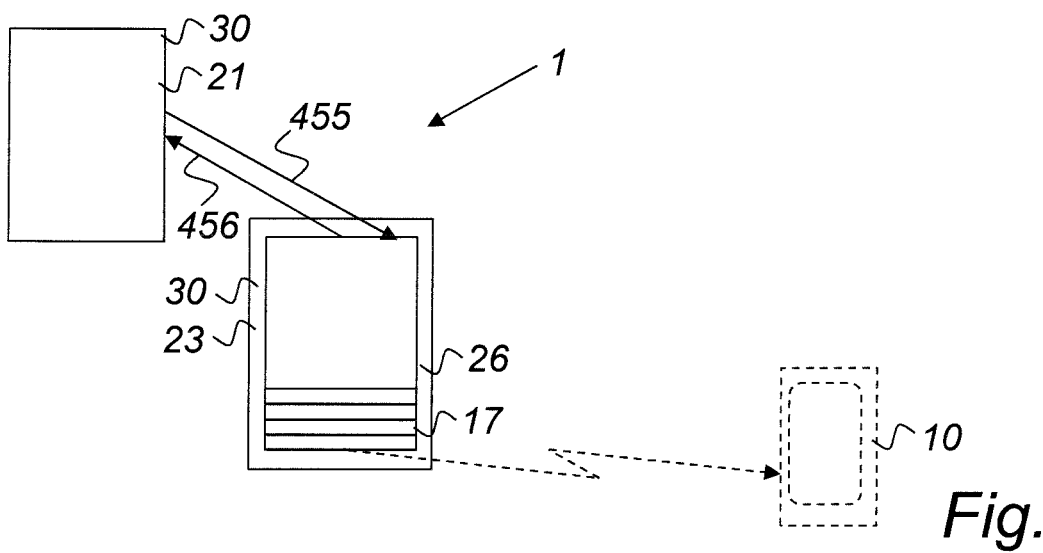

Such a scenario is schematically illustrated in FIG. 14. The MeNB 21 provides a packet with a time stamp 455. The scheduled packet then runs through the buffer 26 of the SeNB 23. Upon leaving the buffer 26, a time of the packet within the SeNB 23 can be determined by comparison with the time stamp. The SeNB 23 sends information 456 to the MeNB 21.

The performing of the rescheduling can also be performed in different variations or embodiments.

If the rescheduling is made in the most straightforward manner, i.e. an additional scheduling of the selected set of packets to the second transmitting node, these packets will normally be placed at the end of the buffer. This may lead to the situation where packets originally scheduled to that transmitting node is placed before earlier packets, which later were rescheduled. Small such deviations can normally be dealt by the reordering functionality in the UE, but for larger sets of rescheduled packets, time-out problems or a limited size of a reordering buffer may cause problems.

Figure 15:
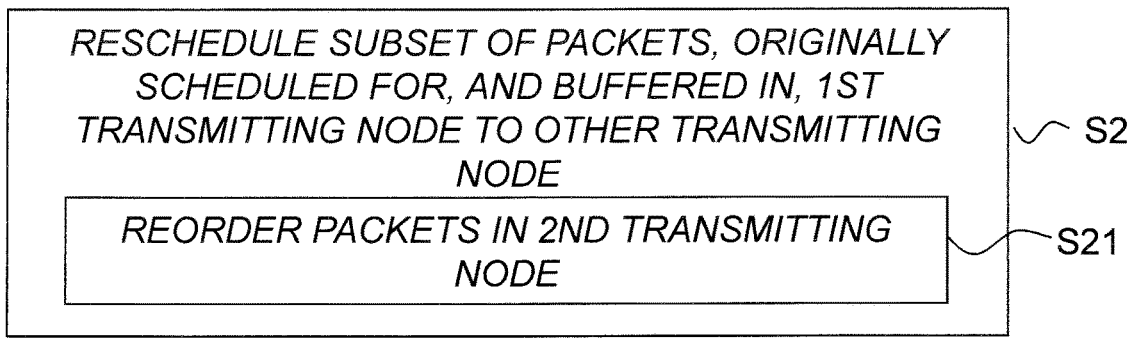
FIG. 15 is a part flow diagram of an embodiment of a rescheduling step.

Therefore, in one preferred embodiment, as illustrated by the flow diagram of FIG. 15, the rescheduling step S2 may comprise the step 21, in which packets in the second transmitting node are reordered after the rescheduling. In other words, the step of rescheduling further comprises reordering packets in the at least one second transmitting node of the multi-connectivity communication system.

As an example, when the CU-UP triggers a PDCP data retransmission of data from one DU to the other, available packet copies in the CU-UP are retransmitted to the other DU and the meta data for each packet is typically updated. The performance can then be further optimized by DU performed packet reordering of the new received retransmitted packets and already existing packets considering e.g. the PDCP sequence number or other meta data. A PDU frame may also comprise a retransmission flag, indicating that such a packet is an object to be retransmitted, and such PDUs is then preferably prioritized during the reordering of packets.

In one embodiment, the step of reordering packets is based on PDCP sequence numbers of the packets.

In another embodiment, the step of reordering packets is based on time stamps of the packets.

In yet another embodiment, the step of reordering packets comprises prioritizing of packets having indications for being objects of retransmission.

Figure 16:
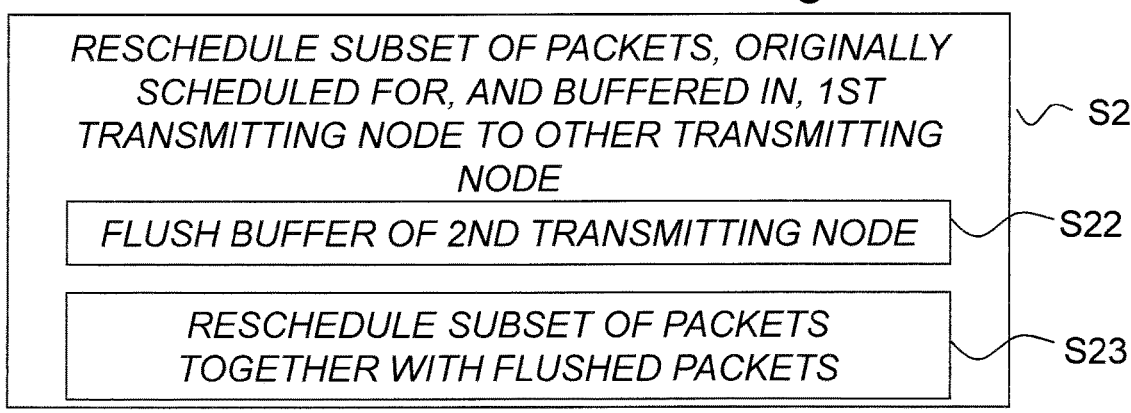
FIG. 16 is a part flow diagram of another embodiment of a rescheduling step.

An alternative embodiment could instead prepare the total set of packets in the CU-UP or MeNB instead. FIG. 16 illustrates a flow diagram of the step S2 of FIG. 5, in which, in step S22, the buffer of the second transmitting node is flushed, entirely or in part. The packets flushed from the second transmitting node may be selected as being packets that should occur after at least one of the packets rescheduled from the first transmitting node. Alternatively, all packets could be flushed. Then in step S23, the subset of packets originally scheduled to the first transmitting node is rescheduled together with the packets flushed from the second transmitting node, all to the second transmitting node. This will then inherently give a reordering of the packets in the second transmitting node.

Reordering may thus be performed in the CU-UP before the actual retransmission of packets to the new DU. This is then performed by initially sending a DL Flush command to the new DU (e.g. discarding existing packets in the DU). Then are these discarded packets resent from the CU together with the packets marked as subject for retransmission, but this time in PDCP SN order to the new DU.

In other words, the step of rescheduling comprises flushing of at least part of a buffer of the at least one second transmitting node of the multi-connectivity communication system. The subset of packets and packets flushed from the at least part of a buffer of the at least one second transmitting node are rescheduled to the at least one second transmitting node.

As indicated above, in one embodiment, the step of flushing comprises flushing of all packets buffered in the at least one second transmitting node of the multi-connectivity communication system.

The CU-UP stores a copy of each packet transmitted to the DUs including meta data including information on which DU. CU-UP discards each copy when an acknowledgement of successful delivery, or transmission if RLC UM.

The set selected for rescheduling can also be constituted in different manners. In a simplest embodiment, all packets in the first transmitting node are selected. In other words, the step of rescheduling comprises rescheduling of all packets, originally scheduled for, and buffered in, the first transmitting node.

In many applications, such a simple approach may operate well. However, in systems where the time interval for discarding old packets is short, some of the rescheduled packets may be too old when they eventually are in position of being transmitted. In such cases, the rescheduling was unnecessary to perform. It might therefore be beneficial to make a fast analysis of which packets that are likely or expected to be discarded if being rescheduled. Such packets are then excluded from the set of packets that is rescheduled.

Thus, in one embodiment, the step of rescheduling comprises rescheduling of all packets, originally scheduled for, and buffered in, the first transmitting node that are expected to be non-discarded if rescheduled.

One may also let information about available bandwidths between the network node performing the packet scheduling and the different transmitting nodes influence the selection of the set of packets to be rescheduled. If, for instance, the transmission between the network node performing the packet scheduling and the second transmitting node has a very low bandwidth, a rescheduling of all packets of the first transmitting node may jam the transmission to the second node. It is therefore preferred if the selection of the packet subset is made in dependence of such bandwidth information.

In one embodiment, the subset of packets is thereby selected in dependence of limitations in bandwidth between a node performing the step of rescheduling and the at least one second transmitting node of the multi-connectivity communication system.

In a preferred embodiment, the network node performing the packet rescheduling or making the selection of the subset of packet to be rescheduled is provided with an overview of the entire system of transmitting nodes and their connections. An overall optimization of the new situation where a first transmitting node suffers from a sudden decrease of data rate can then be performed, in which an optimum or at least beneficial selection of packets to be rescheduled can be performed.

In other words, in one embodiment, the subset of packets is selected in dependence of an estimation of a best distribution of packets between all transmitting nodes of the multi-connectivity communication system.

The first transmitting node, in which the reduced data rate is discovered, may still be used for transmitting some of the packets being present in the buffer. However, it is of no benefit to transmit packets that are already rescheduled. To this end, in a preferred embodiment, the method for transmission control in a multi-connectivity communication system may comprise the further step of flushing all packets of the subset of packets from the first transmitting node.

In other words, as an optional step, it may also be advantageous to send a flush command to the DU with the long round trip time to remove all its PDCP PDUs which have not yet been started to be sent on lower layers. As an alternative, the first step above may be carried out by the DU, which may inform the CU about the estimated time it takes to empty the current buffer, using signaling on the F1 interface. Thus, performance is believed to be further enhanced if a DL Flush is sent to the DU triggering the PDCP data retransmission causing all unsent data to be removed from transmission. This will reduce the load on the DU and the air interface as well as reducing the time until the DU has no data in buffer and therefore is available for new data transmission again.

Figure 17:
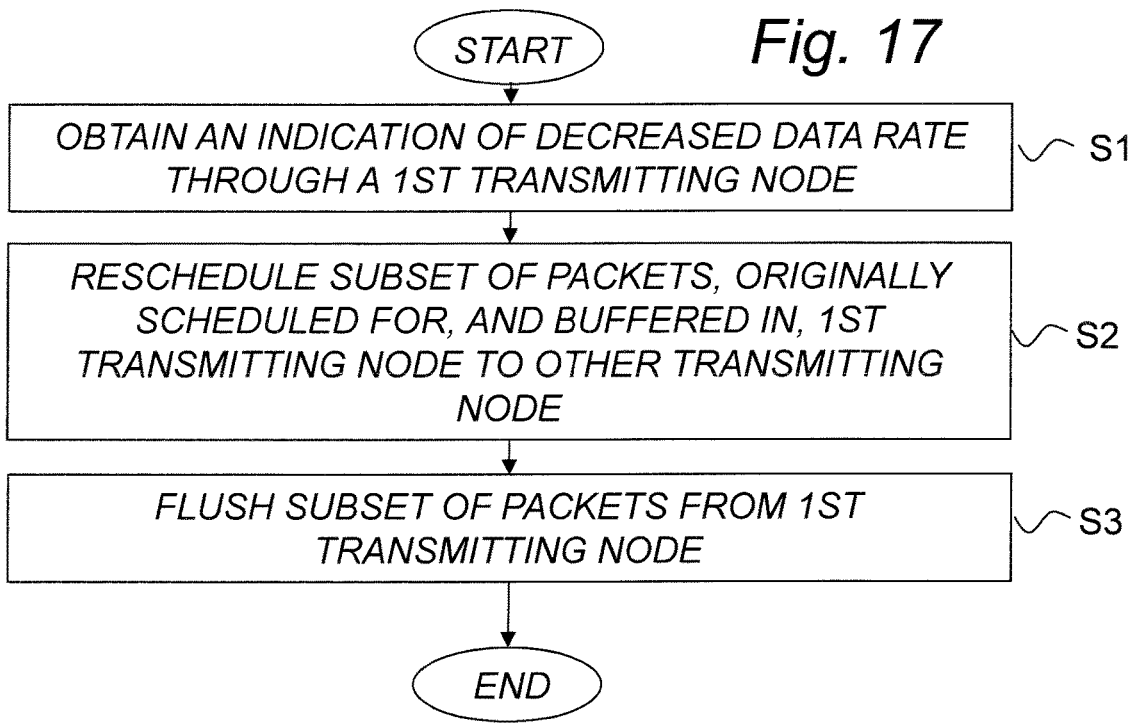
FIG. 17 is a schematic flow diagram illustrating steps of another embodiment of a method for transmission control in a multi-connectivity communication system.

FIG. 17 illustrates a flow diagram of such an embodiment. In step S3, the subset of packets, selected to be rescheduled, is there flushed from the buffer of the first transmitting node.

In a general case, the multi-connectivity communication system may comprise a multitude of transmitting nodes. However, in many common implementations, the multi-connectivity communication system is a dual-connectivity communication system. This means that there is only one said second transmitting node, to which packets can be rescheduled.

In the examples and embodiments above, the packets are to be transmitted downlink.

In alternative embodiments, also uplink transmission can be performed in an analogue manner.

In one preferred embodiment, the packets are protocol data units of a packet data convergence protocol.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

A wireless communication device could also constitute a part of other items being connected to a communication network, e.g. Internet-of-Things (IoT) devices. Such items may range from household apparatuses, building equipment, surveillance items, industrial apparatuses to vehicle related devices. The down link party in the above described embodiments may therefore not only be a regular UE but also all kinds of IoT devices.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an arrangement configured to control transmission in a multi-connectivity communication system. The network node is configured to obtain an indication of decreased data rate through a first transmitting node of a multi-connectivity communication system. The network node is configured to reschedule at least a subset of packets, originally scheduled for, and buffered in, the first transmitting node, to at least one second transmitting node, different from the first transmitting node, of the multi-connectivity communication system, in response to the obtaining of the indication.

In one embodiment, the indication of decreased data rate is based on a transmission-delay related time. The transmission-delay related time is related to transmission delay through a respective transmitting node.

In one further embodiment, the network node is further configured to determine the transmission-delay related time for the first transmitting node, wherein the indication of decreased data rate is based on at least the determined transmission-delay related time for the first transmitting node.

In another further embodiment, the network node is further configured to estimate the transmission-delay related time for the first transmitting node, wherein the indication of decreased data rate is based on at least the estimated transmission-delay related time for the first transmitting node.

In one embodiment, the network node is further configured to determine the transmission-delay related time for at least one second transmitting node, different from the first transmitting node, of the multi-connectivity communication system. The network node is further configured to calculate a transmission-delay related difference or ratio as a difference or ratio, respectively, between the determined transmission-delay related time for the first transmitting node and a quantity based on the determined transmission-delay related time for the at least one second transmitting node. The indication of decreased data rate is based on at least the transmission-delay related difference or ratio.

In one embodiment, the network node is further configured to estimate the transmission-delay related time for at least one second transmitting node, different from the first transmitting node, of the multi-connectivity communication system. The network node is further configured to calculate a transmission-delay related difference or ratio as a difference or ratio, respectively, between the estimated transmission-delay related time for the first transmitting node and a quantity based on the estimated transmission-delay related time for the at least one second transmitting node. The indication of decreased data rate is based on at least the transmission-delay related difference.

In a further embodiment, the transmission-delay related difference or ratio is a time-filtered difference or ratio.

In one embodiment, the quantity based on the transmission-delay related time for the at least one second transmitting node is a transmission-delay related time for one the second transmitting node.

In one embodiment, the quantity based on the transmission-delay related time for the at least one second transmitting node is a minimum transmission-delay related time for all second transmitting nodes.

In one embodiment, the quantity based on the transmission-delay related time for the at least one second transmitting node is an average of transmission-delay related times for all the second transmitting nodes.

In one further embodiment, the average of transmission-delay related times for all the second transmitting nodes is an average weighted with an estimated throughput of each second transmitting node.

In one embodiment, the indication of decreased data rate is concluded if the transmission-delay related difference exceeds a threshold.

In another embodiment, the indication of decreased data rate is concluded if the transmission-delay related ratio exceeds a threshold.

In one embodiment, the network node is further configured to calculate a transmission-delay related derivative as a time derivate of the transmission-delay related time of the first transmitting node.

In a further embodiment, the indication of decreased data rate is concluded if the transmission-delay related derivative exceeds a threshold.

In one embodiment, the indication of decreased data rate is concluded if the transmission-delay related derivative divided by the transmission-delay related time for the first transmitting node exceeds a threshold.

In one embodiment, the transmission-delay related time is a round trip time for a last acknowledged packet transmitted through the respective transmitting node.

In another embodiment, the transmission-delay related time is a time between packet scheduling and receipt of a confirmation of transmission from the respective transmitting node for a last packet transmitted through the respective transmitting node.

In yet another embodiment, the transmission-delay related time is an age of an oldest non-acknowledged packet scheduled to be transmitted through the respective transmitting node.

In yet another embodiment, the transmission-delay related time is an age of an oldest packet scheduled to be transmitted through the respective transmitting node, for which packet no confirmation of transmission from the respective transmitting node is received.

In yet another embodiment, the transmission-delay related time is based on a received quantity representing a present buffer length in the respective transmitting node, wherein the transmission-delay related time is determined as the present buffer length divided by an estimated transmission rate from the respective transmitting node.

In yet another embodiment, the transmission-delay related time is based on a received buffer-time difference of a last transmitted packet from the respective transmitting node. The buffer-time difference is calculated as a difference between a transmission time from the respective transmitting node and a time stamp of the transmitted packet. The time stamp is provided by a node time synchronized with the respective transmitting node.

In one embodiment, the rescheduling comprises rescheduling of all packets, originally scheduled for, and buffered in, the first transmitting node.

In another embodiment, the rescheduling comprises rescheduling of all packets, originally scheduled for, and buffered in, the first transmitting node that are expected to be non-discarded if rescheduled.

In one embodiment, the subset of packets is selected in dependence of limitations in bandwidth between a node performing the rescheduling and the at least one second transmitting node of the multi-connectivity communication system.

In one embodiment, the subset of packets is selected in dependence of an estimation of a best distribution of packets between all transmitting nodes of the multi-connectivity communication system.

In one embodiment, the network node is further configured to reorder packets in the at least one second transmitting node of the multi-connectivity communication system.

In a further embodiment, the reordering packets is based on PDCP sequence numbers of the packets.

In another further embodiment, the reordering packets is based on time stamps of the packets.

In one embodiment, the network node is further configured to flush at least part of a buffer of the at least one second transmitting node of the multi-connectivity communication system. The network node is further configured to schedule the subset of packets and packets flushed from the at least part of a buffer of the at least one second transmitting node to the at least one second transmitting node.

In a further embodiment, the flushing comprises flushing all packets buffered in the at least one second transmitting node of the multi-connectivity communication system.

In one embodiment, the network node is further configured to flush all packets of the subset of packets from the first transmitting node.

In one embodiment, the packets are to be transmitted downlink.

In one embodiment, the network node is a Node B.

In one embodiment, the multi-connectivity communication system is a dual-connectivity communication system, whereby there is one said second transmitting node.

In one embodiment, the packets are protocol data units of a packet data convergence protocol.

Figure 18:
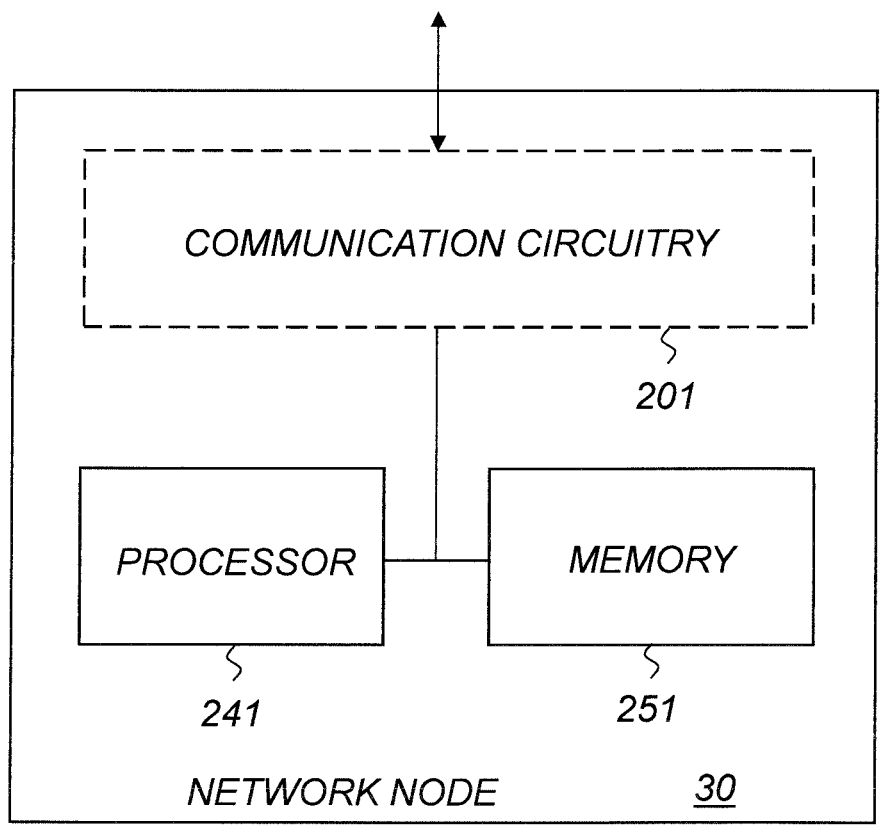
FIG. 18 is a schematic block diagram illustrating an embodiment of a network node.

FIG. 18 is a schematic block diagram illustrating an example of a network node 30, based on a processor-memory implementation according to an embodiment. In this particular example, the network node 30 comprises a processor 241 and a memory 251, the memory 251 comprising instructions executable by the processor 241, whereby the processor 241 is operative to obtain an indication of decreased data rate through a first transmitting node of a multi-connectivity communication system. The instructions executable by the processor 241 are further making the processor 241 operative to reschedule at least a subset of packets, originally scheduled for, and buffered in, the first transmitting node, to at least one second transmitting node of the multi-connectivity communication system, in response to the obtaining of the indication.

In one embodiment the network node comprises communication circuitry.

With reference to FIG. 18, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s).

Figure 19:
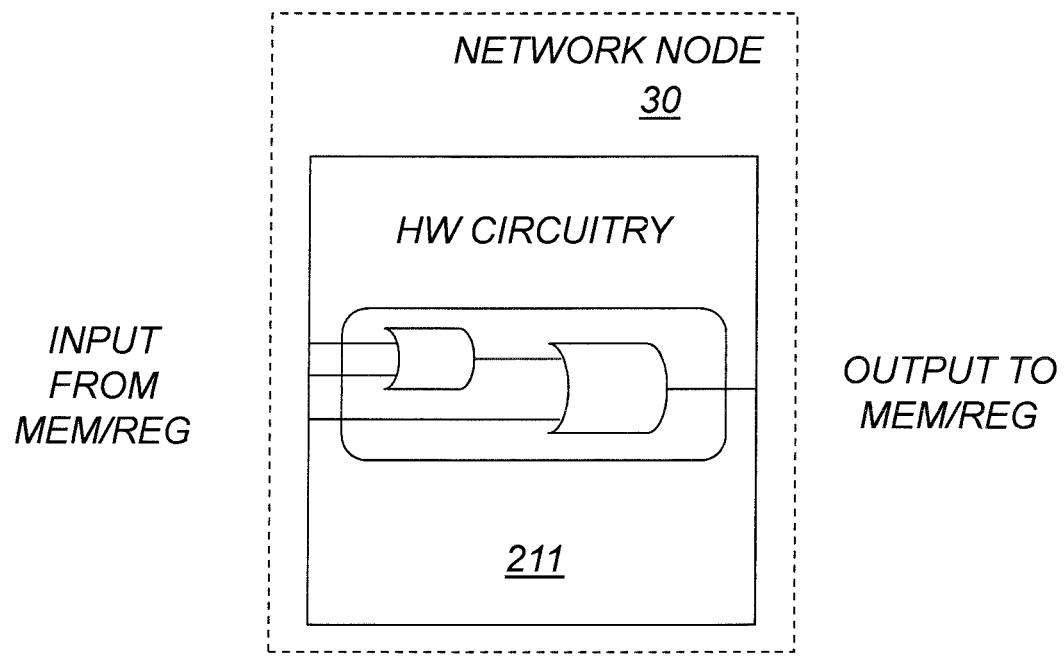
FIG. 19 is a schematic block diagram illustrating an embodiment of a network node based on a hardware circuitry implementation.

FIG. 19 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 20:
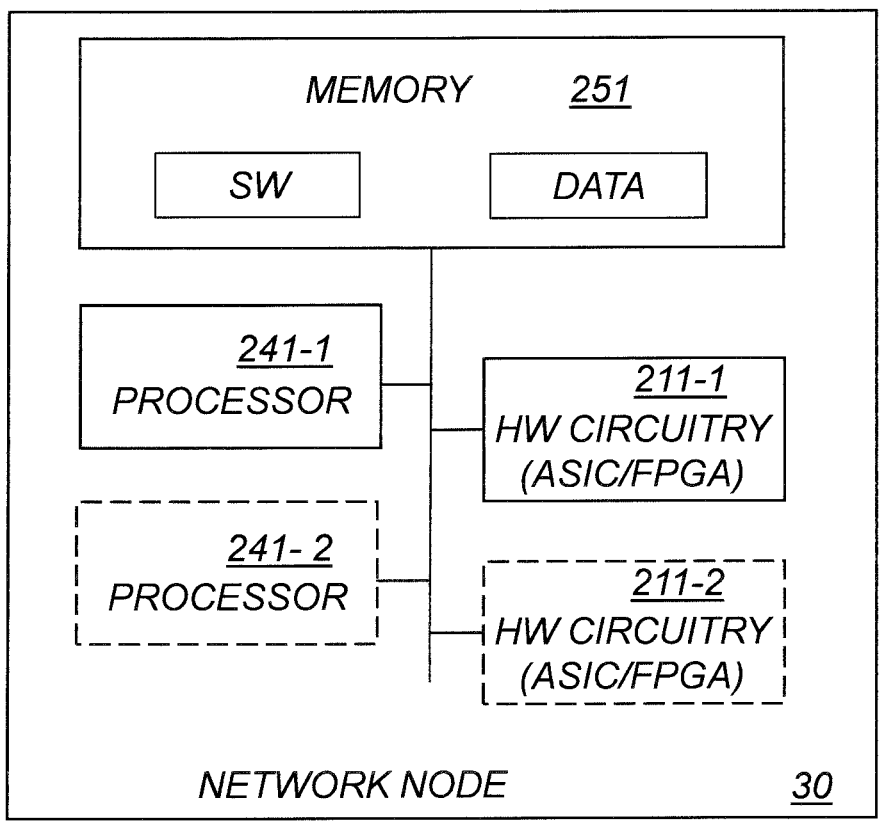
FIG. 20 is a schematic block diagram illustrating another embodiment of a network node based on combination of both processor and hardware circuitry.

FIG. 20 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

FIG. 21 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to obtain an indication of decreased data rate through a first transmitting node of a multi-connectivity communication system. The instructions, when executed by the processor(s) 241, cause the processor(s) 241 further to reschedule at least a subset of packets, originally scheduled for, and buffered in, the first transmitting node, to at least one second transmitting node of the multi-connectivity communication system, in response to the obtaining of the indication.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium. The computer-readable medium have stored thereon a computer program according to the above description.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

FIG. 22 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 23:
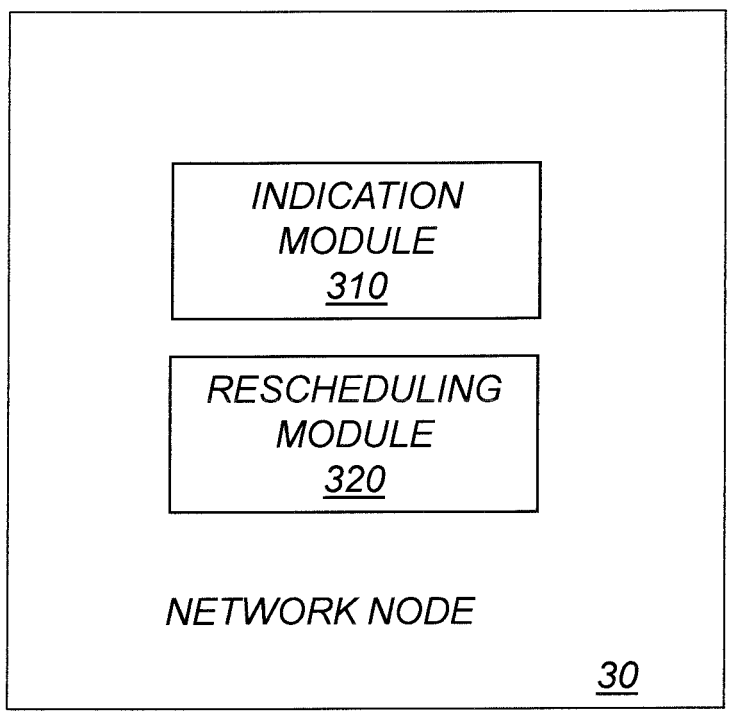
FIG. 23 is a schematic diagram illustrating an embodiment of a network node.

FIG. 23 is a schematic diagram illustrating an example of a network node 30 for control transmission in a multi-connectivity communication system. The network node comprises an indication module 310 for obtaining an indication of decreased data rate through a first transmitting node of a multi-connectivity communication system. The network node further comprises a rescheduling module 320 for rescheduling of at least a subset of packets, originally scheduled for, and buffered in, the first transmitting node, to at least one second transmitting node, different from the first transmitting node, of the multi-connectivity communication system, in response to the obtaining of the indication.

Alternatively it is possible to realize the module(s) in FIG. 23 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 24:
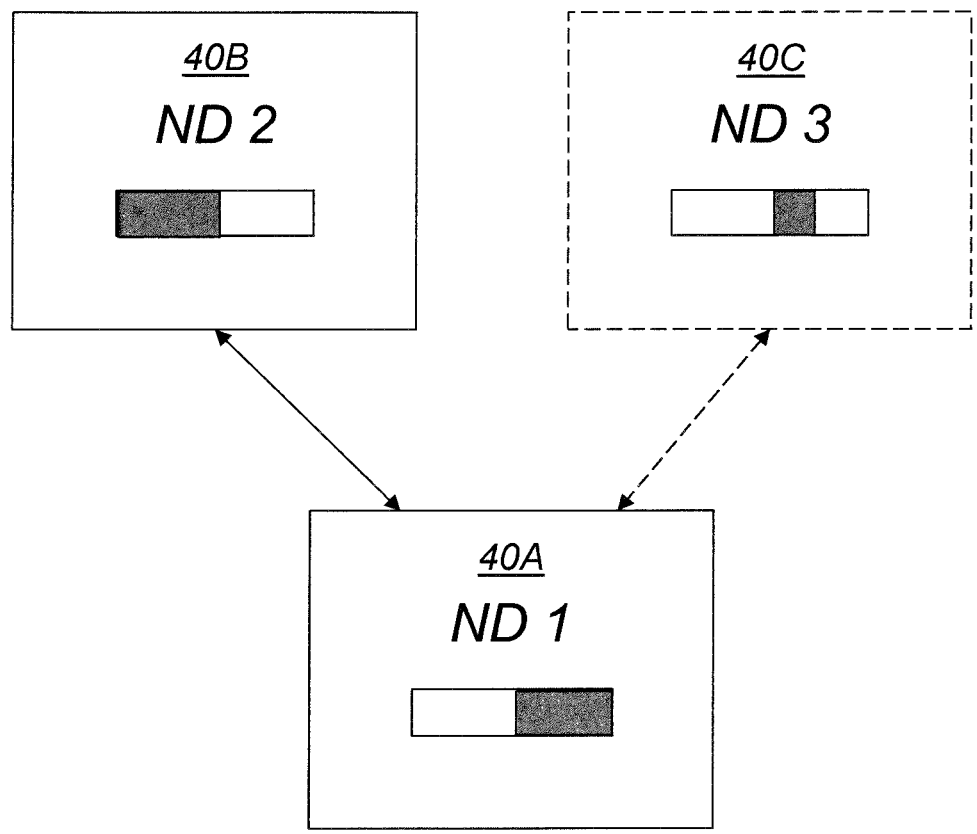
FIG. 24 is a schematic diagram illustrating a general example of functionality distribution or partition.

FIG. 24 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 25:
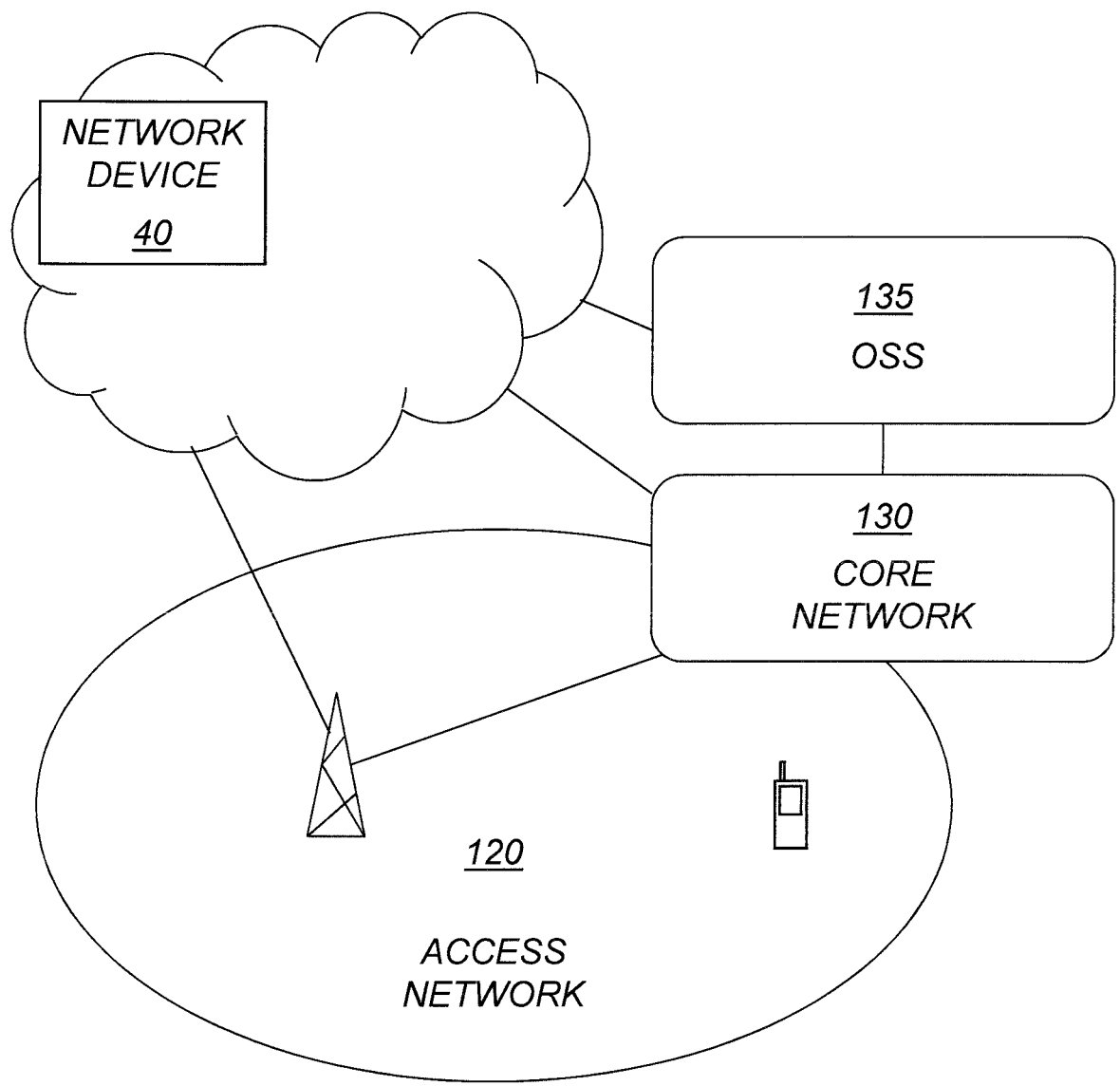
FIG. 25 is a schematic diagram illustrating an example of a wireless communication system in cooperation with one or more cloud-based network devices.

FIG. 25 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporarily shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

Figure 26:
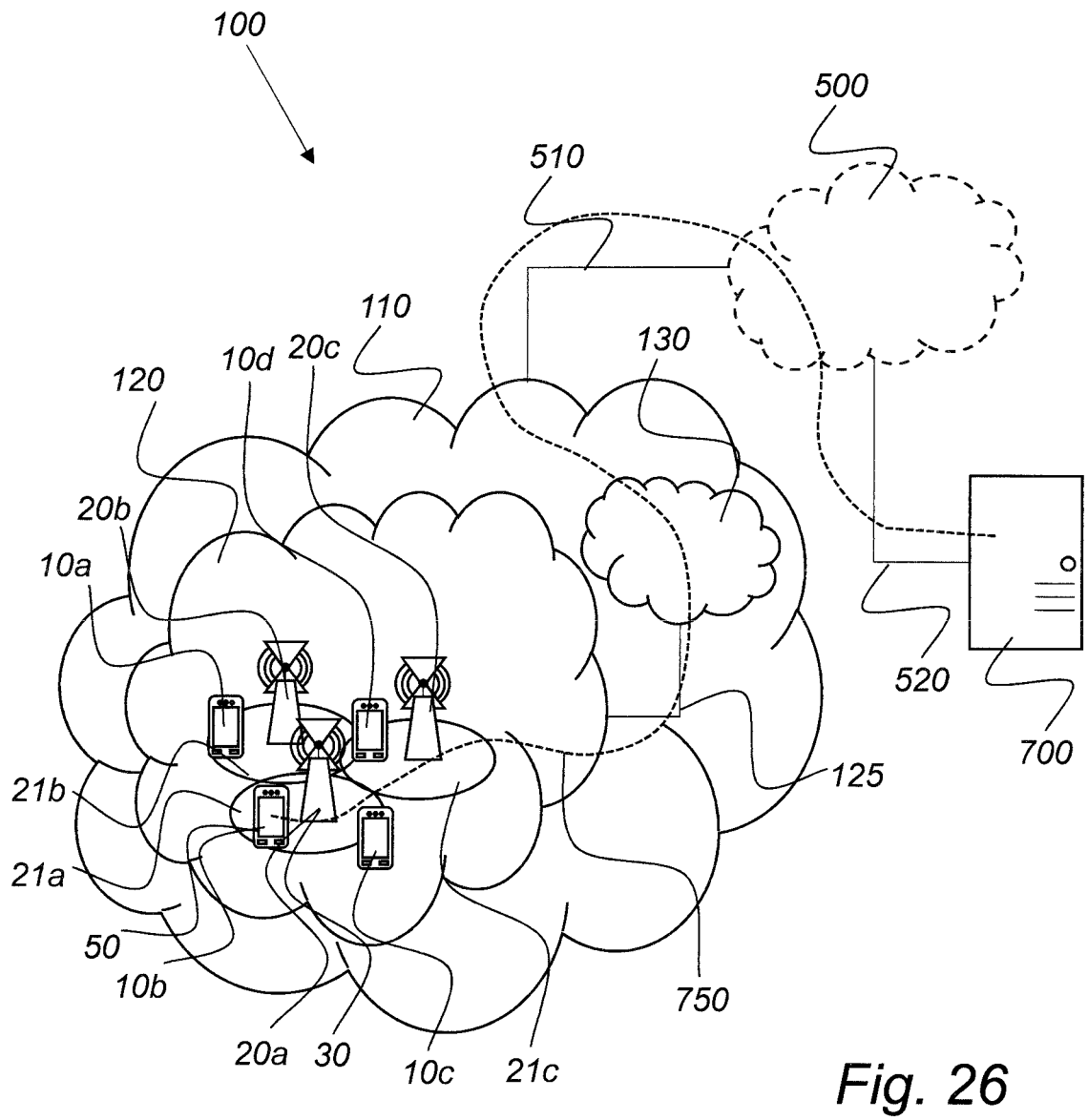
FIG. 26 schematically illustrates a telecommunication network connected via an intermediate network to a host computer.

With reference to FIG. 26, in accordance with an embodiment, a communication system 100 includes a telecommunication network 110, such as a 3GPP-type cellular network, which comprises an access network 120, such as a Radio Access Network (RAN), and a Core Network (CN) 130. The access network 120 comprises a plurality of base stations 20*a*, 20*b*, 20*c*, such as Node Bs (NB), evolved Node Bs (eNB), New Radio Node Bs (gNB) or other types of wireless access points, each defining a corresponding coverage area 21*a*, 21*b*, 21*c*. Each base station 20*a*, 20*b*, 20*c* is connectable to the CN 130 over a wired or wireless connection 125. A first user equipment (UE) 10*a* located in coverage area 21*c* is configured to wirelessly connect to, or be paged by, the corresponding base station 20*c*. A second UE 10*b* in coverage area 21*a* is wirelessly connectable to the corresponding base station 20*a*. While a plurality of UEs 10*a*-*d* are illustrated in this example, the disclosed embodiments are equally applicable to a situation where a sole UE is in the coverage area or where a sole UE is connecting to the corresponding base station 20.

The base station 20 is one type of a network node 30. Many operations that in a typical applications are performed in a base station 20 may alternatively be performed in another network node 30 or even in a node external to the telecommunication network 110. The devices and methods described here below as being performed in a base station 20 should be interpreted as also being possible to perform in a general network node 30.

The UE 10 is one type of a wireless device 11. Many operations that in a typical applications are performed in a UE 10 may alternatively be performed in any other wireless device 11. The devices and methods described here below as being performed in a UE 10 should be interpreted as also being possible to perform in a general wireless device 11.

The telecommunication network 110 is itself connected to a host computer 700, which may be embodied in the hardware and/or software of a standalone server, a cloud implemented server, a distributed server or as processing resources in a server farm. The host computer 700 may be under the ownership or control of a service provider, or may be operated by the service provider or on behalf of the service provider. The connections 510, 520 between the telecommunication network 110 and the host computer 700 may extend directly from the CN 130 to the host computer 700 or may go via an optional intermediate network 500. The intermediate network 500 may be one of, or a combination of more than one of, a public, private or hosted network; the intermediate network 500, if any, may be a backbone network or the Internet; in particular, the intermediate network 500 may comprise two or more sub-networks (not shown).

The communication system of FIG. 26 as a whole enables connectivity between one of the connected UEs 10a-d and the host computer 700. The connectivity may be described as an over-the-top (OTT) connection 750. The host computer 700 and the connected UEs 10a-d are configured to communicate data and/or signalling via the OTT connection 750, using the access network 120, the CN 130, any intermediate network 500 and possible further infrastructure (not shown) as intermediaries. The OTT connection 750 may be transparent in the sense that the participating communication devices through which the OTT connection 750 passes are unaware of routing of uplink and downlink communications. For example, a base station 20 may not or need not be informed about the past routing of an incoming downlink communication with data originating from a host computer 700 to be forwarded (e.g., handed over) to a connected UE 10. Similarly, the base station 20 need not be aware of the future routing of an outgoing uplink communication originating from the UE 10 towards the host computer 700.

Example implementations, in accordance with an embodiment, of the UE, base station and host computer discussed in the preceding paragraphs will now be described with reference to FIG. 27. In a communication system 100, a host computer 700 comprises hardware 710 including a communication interface 730 configured to set up and maintain a wired or wireless connection with an interface of a different communication device of the communication system 100. The host computer 700 further comprises processing circuitry 740, which may have storage and/or processing capabilities. In particular, the processing circuitry 740 may comprise one or more programmable processors, application-specific integrated circuits, field programmable gate arrays or combinations of these (not shown) adapted to execute instructions. The host computer 700 further comprises software 720, which is stored in or accessible by the host computer 700 and executable by the processing circuitry 740. The software 720 includes a host application 722. The host application 722 may be operable to provide a service to a remote user, such as a UE 10 connecting via an OTT connection 750 terminating at the UE 10 and the host computer 700. In providing the service to the remote user, the host application 722 may provide user data which is transmitted using the OTT connection 750.

The communication system 100 further includes a base station 20 provided in a telecommunication system and comprising hardware 155 enabling it to communicate with the host computer 700 and with the UE 10. The hardware 155 may include a communication interface 150 for setting up and maintaining a wired or wireless connection with an interface of a different communication device of the communication system 100, as well as a radio interface 160 for setting up and maintaining at least a wireless connection 165 with a UE 10 located in a coverage area (not shown in FIG. 27) served by the base station 20. The communication interface 150 may be configured to facilitate a connection 151 to the host computer 700. The connection 151 may be direct or it may pass through a CN (not shown in FIG. 27) of the telecommunication system and/or through one or more intermediate networks outside the telecommunication system. In the embodiment shown, the hardware 155 of the base station 20 further includes processing circuitry 170, which may comprise one or more programmable processors, application-specific integrated circuits, field programmable gate arrays or combinations of these (not shown) adapted to execute instructions. The base station 20 further has software 156 stored internally or accessible via an external connection.

The communication system 100 further includes the UE 10 already referred to. Its hardware 185 may include a radio interface 180 configured to set up and maintain a wireless connection 165 with a base station serving a coverage area in which the UE 10 is currently located. The hardware 185 of the UE 10 further includes processing circuitry 190, which may comprise one or more programmable processors, application-specific integrated circuits, field programmable gate arrays or combinations of these (not shown) adapted to execute instructions. The UE 10 further comprises software 186, which is stored in or accessible by the UE 10 and executable by the processing circuitry 190. The software 186 includes a client application 192. The client application 192 may be operable to provide a service to a human or non-human user via the UE 10, with the support of the host computer 700. In the host computer 700, an executing host application 722 may communicate with the executing client application 192 via the OTT connection 750 terminating at the UE 10 and the host computer 700. In providing the service to the user, the client application 192 may receive request data from the host application 722 and provide user data in response to the request data. The OTT connection 750 may transfer both the request data and the user data. The client application 192 may interact with the user to generate the user data that it provides.

Figure 27:
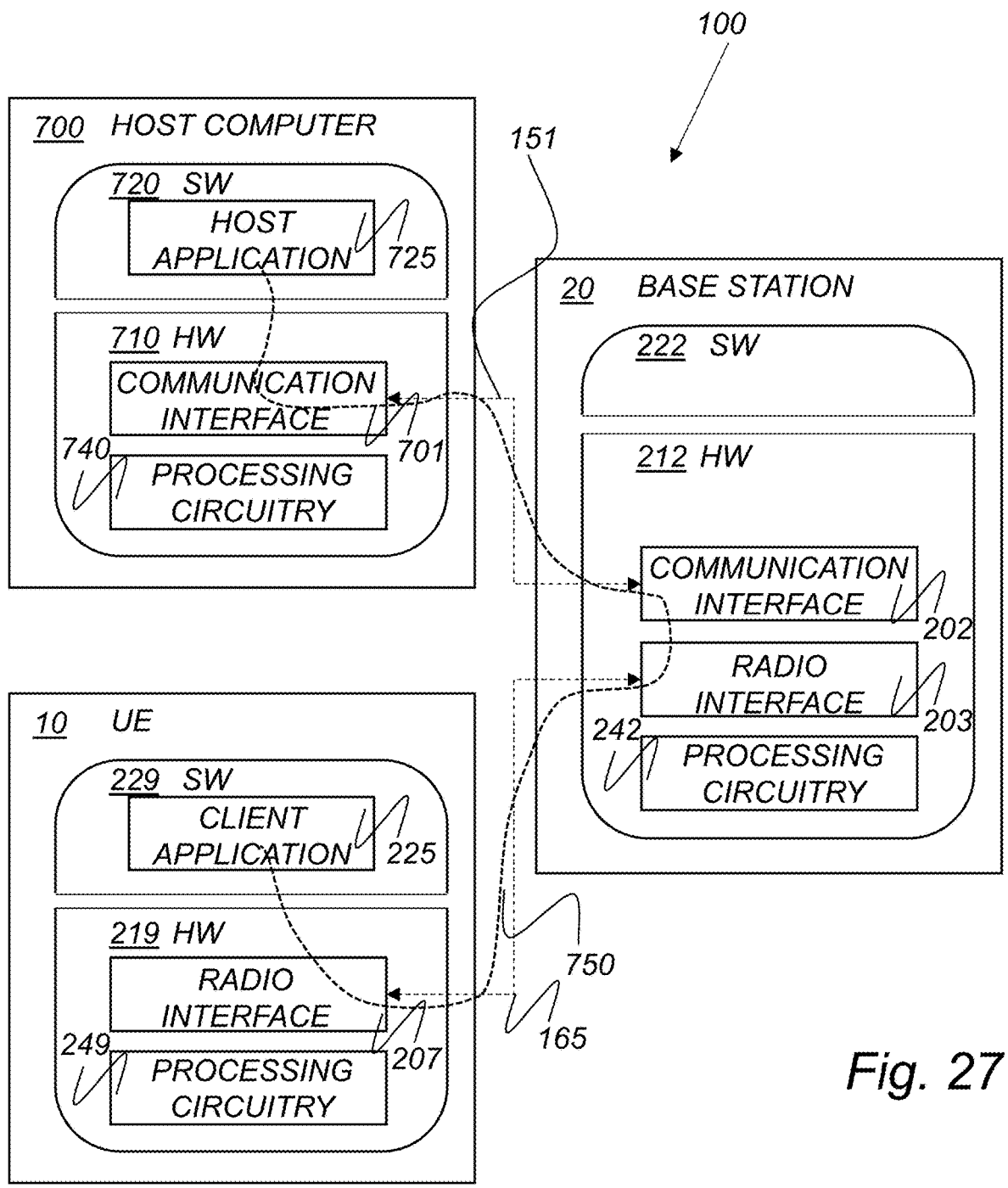
FIG. 27 is a generalized block diagram of a host computer communicating via a base station with a user equipment over a partially wireless connection.

It is noted that the host computer 700, base station 20 and UE 10 illustrated in FIG. 27 may be identical to the host computer 700, one of the base stations 20a, 20b, 20c and one of the UEs 10a-d of FIG. 26, respectively. This is to say, the inner workings of these entities may be as shown in FIG. 27 and independently, the surrounding network topology may be that of FIG. 26.

In FIG. 27, the OTT connection 750 has been drawn abstractly to illustrate the communication between the host computer 700 and the use equipment 10 via the base station 20, without explicit reference to any intermediary devices and the precise routing of messages via these devices. Network infrastructure may determine the routing, which it may be configured to hide from the UE 10 or from the service provider operating the host computer 700, or both. While the OTT connection 750 is active, the network infrastructure may further take decisions by which it dynamically changes the routing (e.g., on the basis of load balancing consideration or reconfiguration of the network).

The wireless connection 165 between the UE 10 and the base station 20 is in accordance with the teachings of the embodiments described throughout this disclosure. One or more of the various embodiments improve the performance of OTT services provided to the UE 10 using the OTT connection 700, in which the wireless connection 165 forms the last segment. More precisely, the teachings of these embodiments may improve the end-to-end throughput and thereby provide benefits such as shorter latency times reducing a user waiting time.

A measurement procedure may be provided for the purpose of monitoring data rate, latency and other factors on which the one or more embodiments improve. There may further be an optional network functionality for reconfiguring the OTT connection 750 between the host computer 700 and UE 10, in response to variations in the measurement results. The measurement procedure and/or the network functionality for reconfiguring the OTT connection 750 may be implemented in the software 720 of the host computer 700 or in the software 186 of the UE 10, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 720, 186 may compute or estimate the monitored quantities. The reconfiguring of the OTT connection 750 may include message format, retransmission settings, preferred routing etc.; the reconfiguring need not affect the base station 20, and it may be unknown or imperceptible to the base station 20. Such procedures and functionalities may be known and practiced in the art. In certain embodiments, measurements may involve proprietary UE signalling facilitating the host computer's 700 measurements of throughput, propagation times, latency and the like. The measurements may be implemented in that the software 720 causes messages to be transmitted, in particular empty or 'dummy' messages, using the OTT connection 750 while it monitors propagation times, errors etc.

Figure 28:
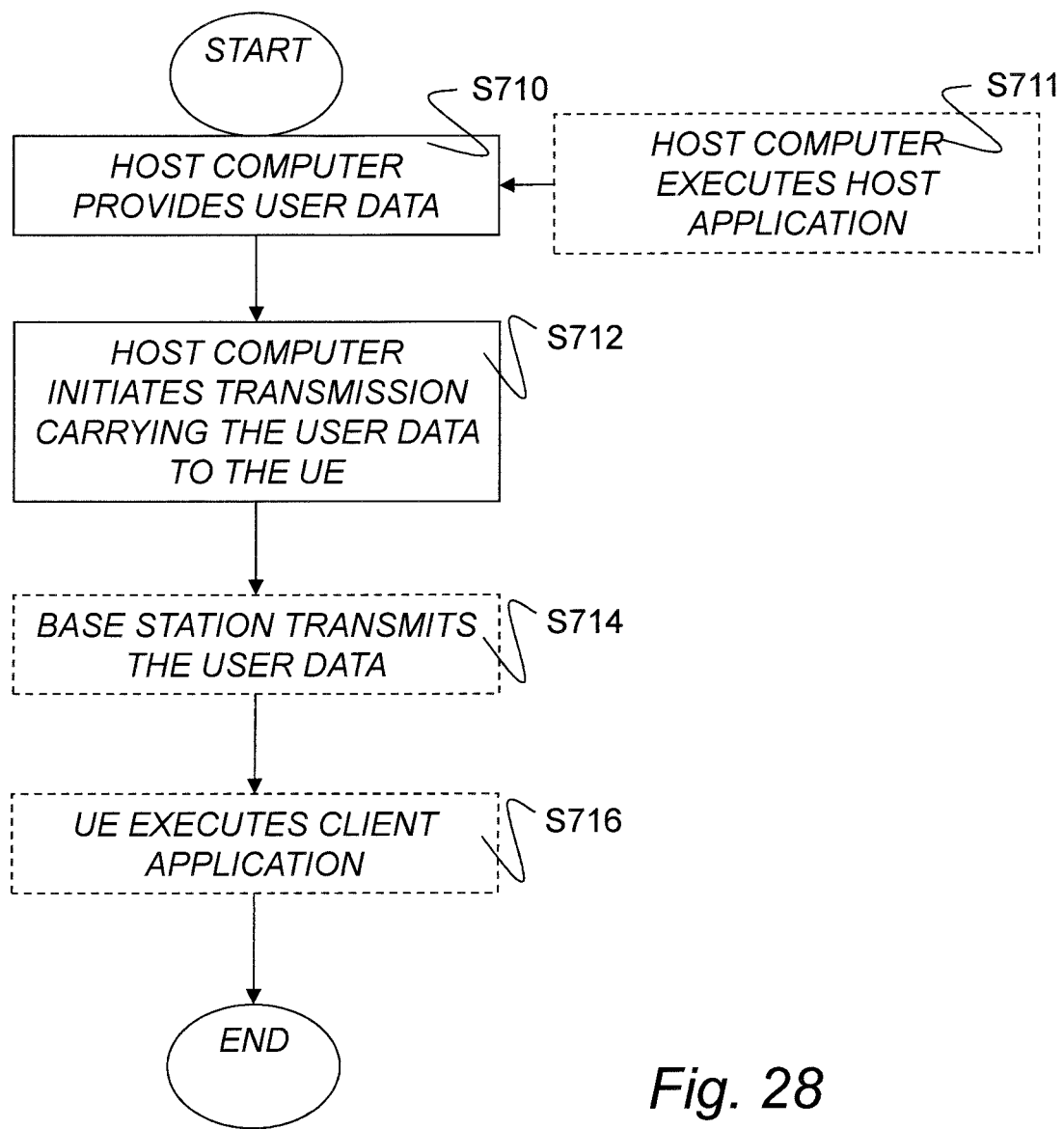
FIGS. 28-31 are flowcharts illustrating methods implemented in a communication system including a host computer, a base station and a user equipment.

FIG. 28 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 28 will be included in this section. In a first step S710 of the method, the host computer provides user data. In an optional substep S711 of the first step S710, the host computer provides the user data by executing a host application. In a second step S712, the host computer initiates a transmission carrying the user data to the UE. In an optional third step S714, the base station transmits to the UE the user data which was carried in the transmission that the host computer initiated, in accordance with the teachings of the embodiments described throughout this disclosure. In an optional fourth step S716, the UE executes a client application associated with the host application executed by the host computer.

Figure 29:
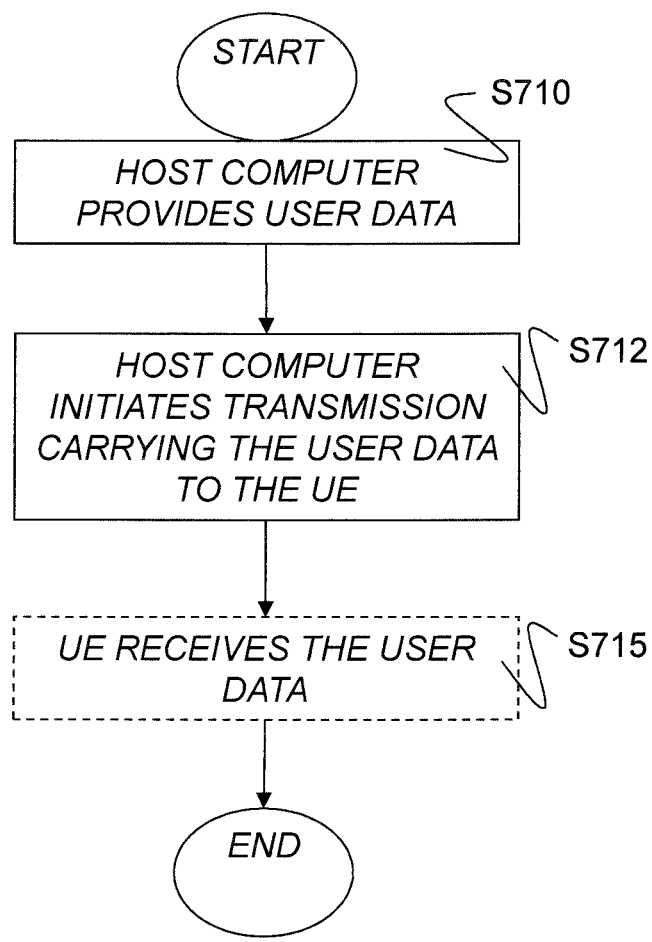

FIG. 29 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 29 will be included in this section. In a first step S710 of the method, the host computer provides user data. In an optional substep (not shown) the host computer provides the user data by executing a host application. In a second step S712, the host computer initiates a transmission carrying the user data to the UE. The transmission may pass via the base station, in accordance with the teachings of the embodiments described throughout this disclosure. In an optional third step S715, the UE receives the user data carried in the transmission.

Figure 30:
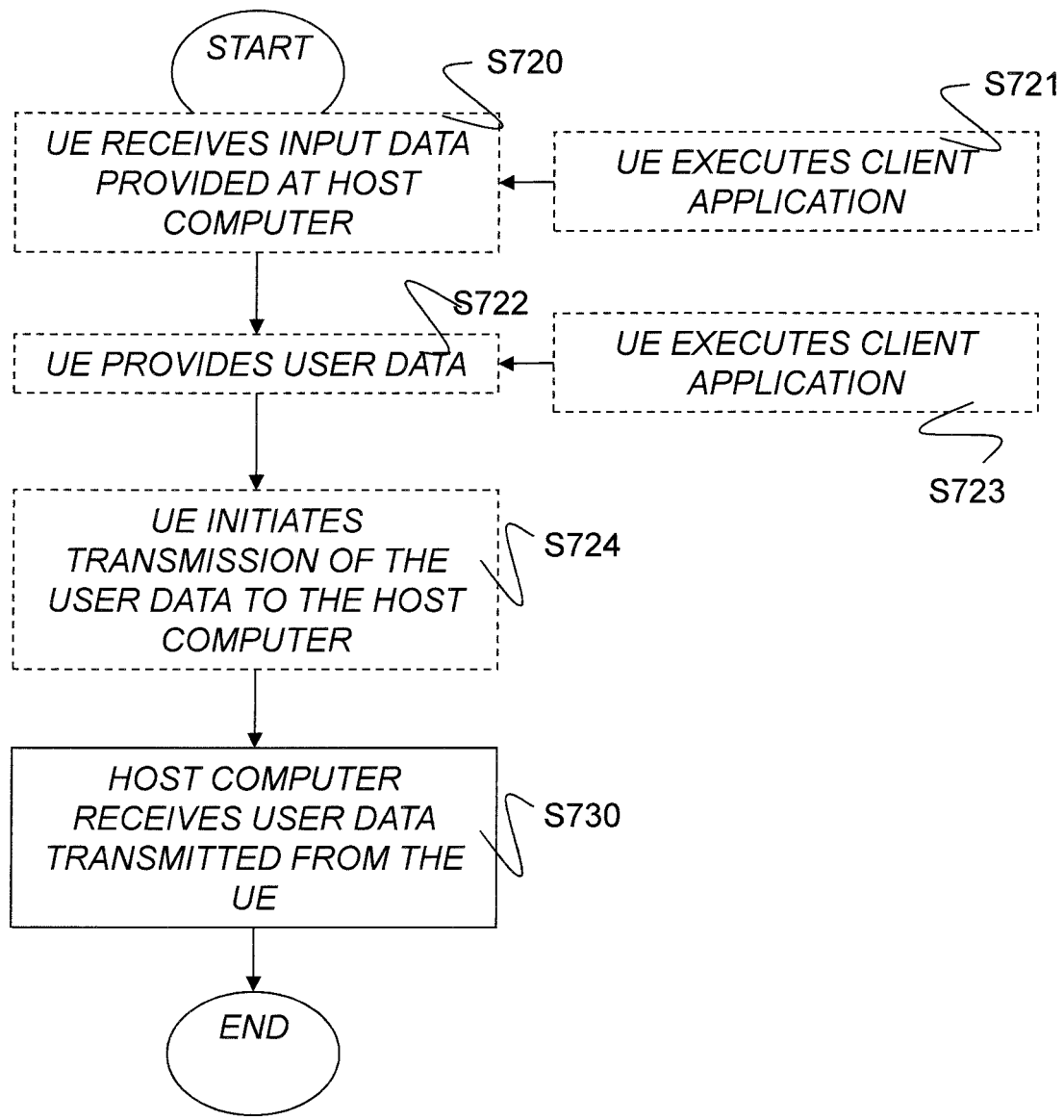

FIG. 30 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 30 will be included in this section. In an optional first step S720 of the method, the UE receives input data provided by the host computer. Additionally or alternatively, in an optional second step S722, the UE provides user data. In an optional substep S723 of the second step S722, the UE provides the user data by executing a client application. In a further optional substep S721 of the first step S720, the UE executes a client application which provides the user data in reaction to the received input data provided by the host computer. In providing the user data, the executed client application may further consider user input received from the user. Regardless of the specific manner in which the user data was provided, the UE initiates, in an optional third substep S724, transmission of the user data to the host computer. In a fourth step S730 of the method, the host computer receives the user data transmitted from the UE, in accordance with the teachings of the embodiments described throughout this disclosure.

Figure 31:
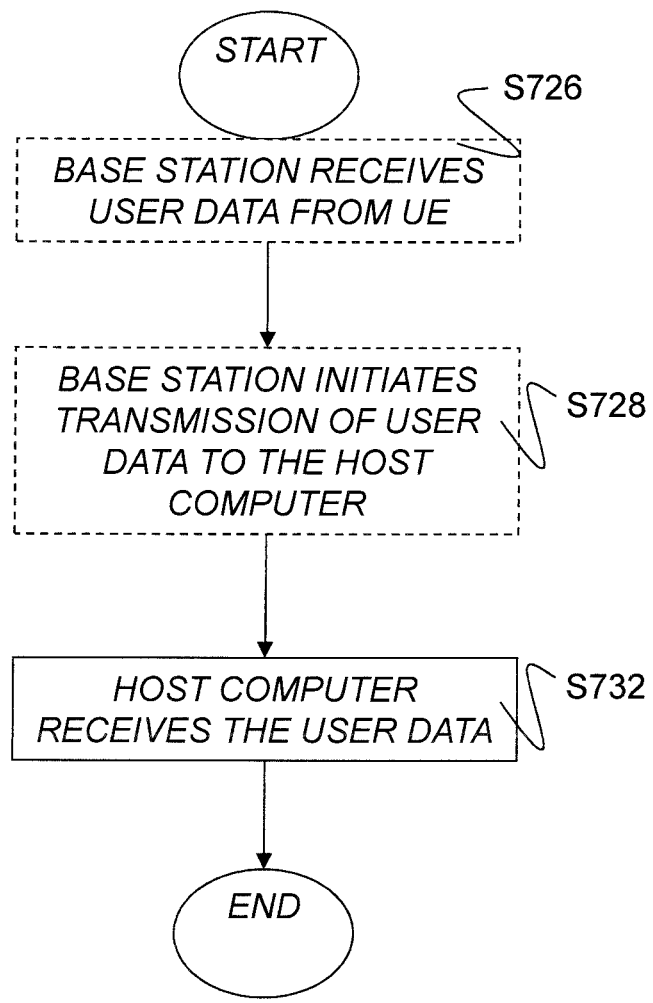

FIG. 31 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 31 will be included in this section. In an optional first step S726 of the method, in accordance with the teachings of the embodiments described throughout this disclosure, the base station receives user data from the UE. In an optional second step S728, the base station initiates transmission of the received user data to the host computer. In a third step S732, the host computer receives the user data carried in the transmission initiated by the base station.

Numbered Embodiments

1. A network node configured to communicate with a wireless device, the network node comprising a radio interface and processing circuitry configured to obtain an indication of decreased data rate through a first transmitting node of a multi-connectivity communication system, and to reschedule at least a subset of packets, originally scheduled for, and buffered in, the first transmitting node, to at least one second transmitting node, different from the first transmitting node, of the multi-connectivity communication system, in response to the obtaining of the indication.

2. The network node of embodiment 1, wherein the network node is a base station.

3. A communication system including a host computer comprising:
processing circuitry configured to provide user data; and
a communication interface configured to forward the user data to a cellular network for transmission to a wireless device,
wherein the cellular network comprises a network node having a radio interface and processing circuitry, the processing circuitry of the network node being configured to obtain an indication of decreased data rate through a first transmitting node of a multi-connectivity communication system, and to reschedule at least a subset of packets, originally scheduled for, and buffered in, the first transmitting node, to at least one second transmitting node, different from the first transmitting node, of the multi-connectivity communication system, in response to the obtaining of the indication.

4. The communication system of embodiment 3, further including the network node.

5. The communication system of embodiment 4, further including the wireless device, wherein the wireless device is configured to communicate with the network node.

6. The communication system of embodiment 5, wherein:
the processing circuitry of the host computer is configured to execute a host application, thereby providing the user data; and
the wireless device comprises processing circuitry configured to execute a client application associated with the host application.

7. The communication system of any of the embodiments 3 to 6, wherein the wireless device is a user equipment.

8. The communication system of any of the embodiments 3 to 7, wherein the network node is a base station.

9. A method implemented in a network node, comprising:
obtaining an indication of decreased data rate through a first transmitting node of a multi-connectivity communication system;
rescheduling at least a subset of packets, originally scheduled for, and buffered in, the first transmitting node, to at least one second transmitting node, different from the first transmitting node, of the multi-connectivity communication system, in response to the obtaining of the indication.

10. A method implemented in a communication system including a host computer, a network node and a wireless device, the method comprising:
at the host computer, providing user data; and
at the host computer, initiating a transmission carrying the user data to the wireless device via a cellular network comprising the network node, wherein the network node obtains an indication of decreased data rate through a first transmitting node of a multi-connectivity communication system, and reschedules at least a subset of packets, originally scheduled for, and buffered in, the first transmitting node, to at least one second transmitting node, different from the first transmitting node, of the multi-connectivity communication system, in response to the obtaining of the indication.

11. The method of embodiment 10, further comprising:
at the network node, transmitting the user data.

12. The method of embodiment 11, wherein the user data is provided at the host computer by executing a host application, the method further comprising:
at the wireless device, executing a client application associated with the host application.

13. The method of any of the embodiments 10 to 12, wherein the wireless device is a user equipment.

14. The method of any of the embodiments 9 to 13, wherein the network node is a base station.

15. A wireless device configured to communicate with a network node, the wireless device comprising a radio interface and processing circuitry configured to obtain an indication of decreased data rate through a first transmitting node of a multi-connectivity communication system, and to reschedule at least a subset of packets, originally scheduled for, and buffered in, the first transmitting node, to at least one second transmitting node, different from the first transmitting node, of the multi-connectivity communication system, in response to the obtaining of the indication.

16. The wireless device of embodiment 15, wherein the wireless device is a user equipment.

17. The wireless device of embodiment 15 or 16, wherein the network node is a base station.

18. A communication system including a host computer comprising:
a communication interface configured to receive user data originating from a transmission from a wireless device to a network node,
wherein the wireless device comprises a radio interface and processing circuitry, the processing circuitry of the wireless device being configured to obtain an indication of decreased data rate through a first transmitting node of a multi-connectivity communication system, and to reschedule at least a subset of packets, originally scheduled for, and buffered in, the first transmitting node, to at least one second transmitting node, different from the first transmitting node, of the multi-connectivity communication system, in response to the obtaining of the indication.

19. The communication system of embodiment 18, further including the wireless device.

20. The communication system of embodiment 19, further including the network node, wherein the network node comprises a radio interface configured to communicate with the wireless device and a communication interface configured to forward to the host computer the user data carried by a transmission from the wireless device to the network node.

21. The communication system of embodiment 18 or 19, wherein:
the processing circuitry of the host computer is configured to execute a host application; and
the processing circuitry of the wireless device is configured to execute a client application associated with the host application, thereby providing the user data.

22. The communication system of embodiment 18 or 19, wherein:
the processing circuitry of the host computer is configured to execute a host application, thereby providing request data; and
the processing circuitry of the wireless device is configured to execute a client application associated with the host application, thereby providing the user data in response to the request data.

23. The communication system of any of the embodiments 18 to 22, wherein the wireless device is a user equipment.

24. The communication system of any of the embodiments 18 to 22, wherein the network node is a base station.

25. A method implemented in a wireless device, comprising:
obtaining an indication of decreased data rate through a first transmitting node of a multi-connectivity communication system;
rescheduling at least a subset of packets, originally scheduled for, and buffered in, the first transmitting node, to at least one second transmitting node, different from the first transmitting node, of the multi-connectivity communication system, in response to the obtaining of the indication.

26. The method of embodiment 25, further comprising:
providing user data; and
forwarding the user data to a host computer via the transmission to a network node.

27. A method implemented in a communication system including a host computer, a network node and a wireless device, the method comprising:
at the host computer, receiving user data transmitted to the network node from the wireless device, wherein the wireless device obtains an indication of decreased data rate through a first transmitting node of a multi-connectivity communication system, and reschedules at least a subset of packets, originally scheduled for, and buffered in, the first transmitting node, to at least one second transmitting node, different from the first transmitting node, of the multi-connectivity communication system, in response to the obtaining of the indication.
28. The method of embodiment 27, further comprising:
at the wireless device, providing the user data to the network node.
29. The method of embodiment 28, further comprising:
at the wireless device, executing a client application, thereby providing the user data to be transmitted; and
at the host computer, executing a host application associated with the client application.
30. The method of embodiment 28, further comprising:
at the wireless device, executing a client application; and
at the wireless device, receiving input data to the client application, the input data being provided at the host computer by executing a host application associated with the client application,
wherein the user data to be transmitted is provided by the client application in response to the input data.
31. The method of any of the embodiments 27 to 30, wherein the network node is a base station.
32. The method of any of the embodiments 25 to 31, wherein the wireless device is a user equipment.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Appendix a Automatic Control Nomenclature

The following subsection explains the basics of the terminology used. It is stressed that this terminology is part of the prior art in the field of automatic control.

As a start a number of representations of a dynamic process need to be introduced. A dynamic process is one where the output depends not only on the present input signal but also on previous inputs and outputs. Put otherwise the dynamic process has memory. The most basic dynamic process is the linear one that can be described by a differential equation as:

$$y^{(n)}(t)+a_1 y^{(n-1)}+\ldots+a_n y(t)=b_0 u^{(n)}(t)+\ldots b_n u(t). \quad (A1)$$

Here y(t) is the output signal, u(t) is the input signal, t is the time, while $a_i$ i=1 . . . n and $b_j$ j=0, . . . , m are constant parameters. (i) denotes differentiation wrt time i times. The above differential equation has order n. It has one input signal and one output signal. For simplicity all concepts are explained in this context, but the generalization to more than one input signal and more than one input signal is available in prior art textbooks.

By taking Laplace transforms and setting initial values to zero, the differential equation is transformed to be represented by a transfer function H(s), where s denotes the Laplace transform variable which is closely related to the angular frequency used in Fourier transforms. The result is:

$$H(s) = \frac{B(s)}{A(s)} = \frac{b_0 s^m + b_1 s^{m-1} + \ldots + b_m}{s^n + a_1 s^{n-1} + \ldots + a_n}. \quad (A2)$$

The relation between the output signal and input signal Laplace transforms Y(s) and U(s) are:

$$Y(s)=H(s)U(s). \quad (A3)$$

The poles $p_i$ i=1, . . . , n of the process are given by the equation A(s)=0. For simplicity only strictly stable (open loop) processes with all poles in the left complex half plane is considered here. In general poles are real or complex conjugate pairs.

The properties of the dynamic process can also be studied in the frequency domain in terms of complex valued frequency functions Y(jω), H(jω) and U(jω). ω denotes the angular frequency that fulfils:

$$\omega=2\pi f, \quad (A4)$$

where f is the frequency in Hz. Below, frequency is used for angular frequency.

Figure 3:
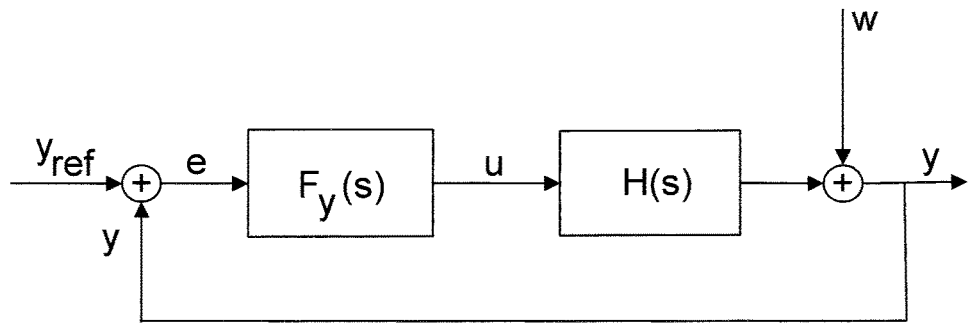
FIG. 3 is a block diagram defining automatic control nomenclature.

The following definition are best explained with respect to FIG. 3, where $F_y(s)$ is the feedback gain. The closed loop system is then computed as follows:

$$Y(s)=W(s)+H(s)F_y(s)(Y_{ref}(s)-Y(s)), \quad (A5)$$

which gives:

$$Y(s) = \frac{F_y(s)H(s)}{1+F_y(s)H(s)} Y_{ref}(s) + \frac{1}{1+F_y(s)H(s)} W(s). \quad (A6)$$

This gives the effect of the reference signal and the disturbance on the output.

The remaining definitions now follow. The closed loop bandwidth $\omega_{CL}$ of the control system is given by the equation:

$$\left|\frac{F_y(j\omega_{CL})H(j\omega_{CL})}{1+F_y(j\omega_{CL})H(j\omega_{CL})}\right|^2 = \frac{1}{2}\left|\frac{F_y(0)H(0)}{1+F_y(0)H(0)}\right|^2. \quad (A7)$$

The closed loop static error of the control system is given by the equation:

$$y_{ref} - y = \frac{1}{1+F_y(0)H(0)}(y_{ref}-w), \quad (A8)$$

The static disturbance rejection of the control system is given by the static sensitivity function:

$$S(0) = \frac{1}{1+F_y(0)H(0)}. \quad (A9)$$

The dynamic disturbance rejection of the control system is determined by the sensitivity function:

$$S(j\omega) = \frac{1}{1+F_y(j\omega)H(j\omega)} \quad (A10)$$

The complimentary sensitivity function of the control system, T(jω)=1−S(jω) determines the robustness of the control system with respect to un-modelled dynamics.

Appendix B a Globally Stable Single Leg Flow Control Algorithm

Figure 4:
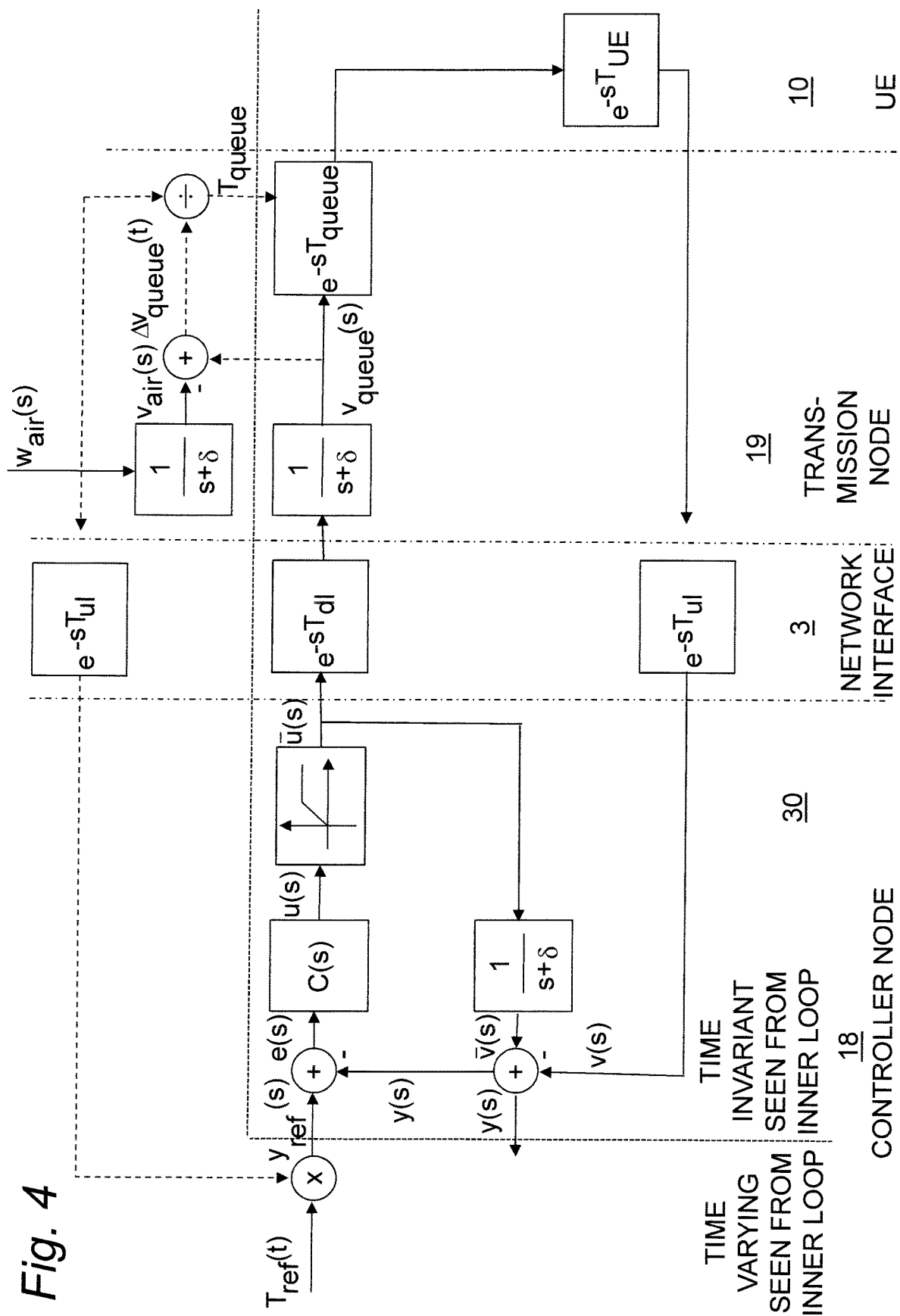
FIG. 4 is a block diagram of an embodiment of a single leg flow control algorithm.

The single leg flow control algorithm of FIG. 4 is one feasible example of a control algorithm possible to use together with the presently presented technology. This algorithm controls the round-trip travel time of packets from a primary node, over a downlink network interface to a secondary wireless transmitting node, over a downlink wireless interface to the UE, where ACK/NACKS may be formed, back to the secondary node, over an uplink wireless interface, and further on back to the primary node, over an uplink backhaul interface.

The algorithm is, as proved in [1], globally stable for all delays and proportional controller gains, in the case where the parameter δ tends to 0.

It is computationally simple, with the controller gain being reduced to a constant.

To relate the nodes of FIG. 4 to the dual connectivity setting, the primary node is the MeNB, the secondary node is the SeNB and the network interface is the interface between the MeNB and the SeNB. The following explains the variables of FIG. 3, where an independent variable t indicates time domain and s indicates frequency domain:

$T_{ref}(t)$ is the setpoint for the round trip time of data/ACK/NACKs around the loop.
$w_{air}(t)$ is the air interface rate.
$y_{ref}(s)$ is the setpoint for the number of data items (bits) around the loop.
$e(s)$ is the control error.
$C(s)=C$ is the constant controller gain.
$u(s)$ is the control signal, here the data rate.
$e^{-sT_{dl}}$ represents the downlink network delay.
$(s+\delta)^{-1}$ represents a step up of a first quantity related to the data volume in the loop.
$v_{queue}(s)$ represents a first quantity related to the data volume in the loop.
$e^{-sT_{queue}}$ represents the wireless interface delays plus the UE delay.
$e^{-sT_{UE}}$ represents the uplink backhaul delay.
$e^{-sT_{ul}}$ represents the dwell time of the queue.
$v(s)$ represents a second quantity related to the data volume in the loop.
$\bar{v}(s)$ represents a third quantity related to the data volume in the loop.
$y(s)$ represents the data volume in the loop. The corresponding round trip time can e.g. be computed as:

$$T(t)=y(t)/w_{air}(t) \quad (B1)$$

This is the controlled quantity. For details regarding the operation of the algorithm and its analysis reference is made to reference [1].

ABBREVIATIONS

5G Fifth Generation
ASIC Application Specific Integrated Circuits
BTS Base Transceiver Stations
CD Compact Disc
CN Core Network
COTS Common Off-The-Shelf
CPE Customer Premises Equipment
CPU Central Processing Units
CU Central Unit
CU-UP Central Unit, User Plane part
DSP Digital Signal Processors
DU Distributed Unit
DVD Digital Versatile Disc
eNB evolved Node B
FPGA Field Programmable Gate Arrays
gNB New Radio Node B
HDD Hard Disk Drive
HW hardware
I/O input/output
IoT Internet of Things
LEE Laptop Embedded Equipment
LME Laptop Mounted Equipment
LTE Long-Term Evolution
MEM memory units
MeNB Master eNB
NB Node B
NCS Networked Control Systems
ND Network Device
NFV Network Function Virtualization
NI Network Interfaces
NIC Network Interface Controller
OS Operating System
OSS Operations and Support System
PC Personal Computer
PDA Personal Digital Assistant
PDCP Packet Data Convergence Protocol
PDU Protocol Data Unit
PLC Programmable Logic Controllers
RAM Random Access Memory
RAN Radio Access Network
RAT Radio Access Technology
REG registers
RLC Radio Link Control
ROM Read-Only Memory
RRU Remote Radio Units
SeNB Secondary eNB
STA Station
SW software
TN Transport Network
UE User Equipment
USB Universal Serial Bus
VM Virtual Machine
VMM Virtual Machine Monitor
VNE Virtual Network Element
WNIC Wireless Network Interface Controller

REFERENCES

[1] T. Wigren and R. Karaki, "Globally stable wireless data flow control", IEEE Trans. Contr. Network Systems, vol. 5, no. 1, pp. 469-478, 2018. DOI: 10.1109/TCNS.2016.2619906.

The invention claimed is:

1. A method for transmission control in a multi-connectivity communication system, wherein said method comprises:
obtaining an indication of decreased data rate through a first transmitting node of a multi-connectivity communication system; and
rescheduling at least a subset of packets originally scheduled for downlink transmission by and already buffered in said first transmitting node, to at least one second transmitting node, different from said first transmitting node, of said multi-connectivity communication system, in response to said obtaining of said indication, wherein the subset of packets is selected in dependence of an estimation of a best distribution of packets between all transmitting nodes of said multi-connectivity communication system.

2. The method of claim 1, wherein the indication of decreased data rate is based on a transmission-delay related time, said transmission-delay related time being related to transmission delay through a respective transmitting node.

3. The method of claim 2, wherein obtaining said indication comprises determining said transmission-delay related time for said first transmitting node, and wherein said indication of decreased data rate is based on at least said determined transmission-delay related time for said first transmitting node.

4. The method of claim 3, wherein obtaining said indication comprises:
  determining said transmission-delay related time for at least one second transmitting node, different from said first transmitting node, of said multi-connectivity communication system; and
  calculating a transmission-delay related difference or ratio as a difference or ratio, respectively, between said determined transmission-delay related time for said first transmitting node and a quantity based on said determined transmission-delay related time for said at least one second transmitting node;
  wherein said indication of decreased data rate is based on at least said transmission-delay related difference or ratio.

5. The method of claim 1, wherein the subset of packets is selected in dependence of limitations in bandwidth between a node performing said step of rescheduling and said at least one second transmitting node of said multi-connectivity communication system.

6. A network node configured to control transmission in a multi-connectivity communication system, the network node comprising:
  a processor; and
  a memory operatively connected to the processor and comprising instructions executable by the processor, whereby the processor is configured to:
    obtain an indication of decreased data rate through a first transmitting node of said multi-connectivity communication system; and
    reschedule at least a subset of packets originally scheduled for downlink transmission by and already buffered in said first transmitting node, to at least one second transmitting node, different from said first transmitting node, of said multi-connectivity communication system, in response to said obtaining of said indication,
  wherein the processing circuit is configured to select the subset of packets in dependence of an estimation of a best distribution of packets between all transmitting nodes of said multi-connectivity communication system.

7. The network node of claim 6, wherein the indication of decreased data rate is based on a transmission-delay related time, said transmission-delay related time being related to transmission delay through a respective transmitting node.

8. The network node of claim 7, wherein the processing circuit is further configured to determine said transmission-delay related time for said first transmitting node, wherein said indication of decreased data rate is based on at least said determined transmission-delay related time for said first transmitting node.

9. The network node of claim 8, wherein the processing circuit is further configured to determine said transmission-delay related time for at least one second transmitting node, different from said first transmitting node, of said multi-connectivity communication system, and to calculate a transmission-delay related difference or ratio as a difference or ratio, respectively, between said determined transmission-delay related time for said first transmitting node and a quantity based on said determined transmission-delay related time for said at least one second transmitting node, wherein said indication of decreased data rate is based on at least said transmission-delay related difference or ratio.

10. The network node of claim 6, wherein the processing circuit is configured to select the subset of packets in dependence of limitations in bandwidth between a node performing said rescheduling and said at least one second transmitting node of said multi-connectivity communication system.

* * * * *